US005164900A

United States Patent [19]

Bernath

[11] Patent Number: 5,164,900

[45] Date of Patent: Nov. 17, 1992

[54] METHOD AND DEVICE FOR PHONETICALLY ENCODING CHINESE TEXTUAL DATA FOR DATA PROCESSING ENTRY

[76] Inventor: Colman Bernath, 26-4, Sublane 342, Lane 150, Hsinyi Road, Sec. 5, Taipei, Taiwan, 10510

[21] Appl. No.: 357,499

[22] Filed: May 26, 1989

Related U.S. Application Data

[63] Continuation of Ser. No. 551,555, Nov. 14, 1983, abandoned.

[51] Int. Cl.[5] .......... G06F 3/06

[52] U.S. Cl. .......... 364/419; 395/2

[58] Field of Search .......... 364/419, 513.5

[56] References Cited

U.S. PATENT DOCUMENTS

| | | | |
|---|---|---|---|
| 4,096,934 | 7/1978 | Kirmser et al. . | |
| 4,193,119 | 3/1980 | Arase et al. | 364/900 |
| 4,298,957 | 11/1981 | Duvall et al. | 364/900 |
| 4,327,421 | 4/1982 | Wang | 364/900 |
| 4,365,315 | 12/1982 | Jamnik | 364/900 |
| 4,379,288 | 4/1983 | Leung . | |
| 4,462,703 | 7/1984 | Lee . | |
| 4,468,754 | 8/1984 | Asada et al. | 364/900 |
| 4,468,756 | 8/1984 | Chan . | |
| 4,484,305 | 11/1984 | Ho | 364/900 |
| 4,498,143 | 2/1985 | Strzelecki . | |
| 4,502,128 | 2/1985 | Okajima et al. | 364/900 |
| 4,505,602 | 3/1985 | Wong | 364/419 X |
| 4,543,631 | 9/1985 | Kurosu et al. | 364/419 X |
| 4,544,276 | 10/1985 | Horodeck | 364/900 X |

*Primary Examiner*—David L. Clark

[57] ABSTRACT

A method and device for coded entry of Chinese character text data into a word processing, display, printing, telecommunication, etc. system. In the principal embodiment of the invention, an electronic input keyboard is used that has keys marked with phonetic notations suitable to represent Chinese speech sounds, as well as a set of "character position keys," operated by the following encoding rules: (1) the text is divided into blocks of characters, where one block may contain one or more characters, each block to be encoded by one uninterrupted typing sequence; (2) if the pronunciation of a block is unique, encoding is done simply by entering on the keyboard the phonetic data of the character(s) making up the block; (3) if the pronunciation of a block is not unique, first the phonetic data of a string of characters making up a longer block is entered, the pronunciation of that longer block being unique and the block to be encoded being a part of the longer block, and then by using the "character position keys" the operator enters the "position data," that is, the position(s) which the character(s) of the block to be encoded occupy within that longer block. In an alternative embodiment, part or all of the phonetic data of the characters are entered into the encoding apparatus, not by keyboard means, but by the use of an acoustic speech sound analyzer.

19 Claims, 9 Drawing Sheets

FIG. 3

SELECTED CHINESE CHARACTERS AND THEIR PHONETIC AND MORPHEMIC DATA IN MANDARIN CHINESE

| Character Code+ | Graphic Form | Meaning | Phonetic Spellings | | Speech Morpheme Code+ |
|---|---|---|---|---|---|
| 0001 | 說 | to speak; to say | shuō | or ㄕㄨㄛˉ | 821 |
| 0002 | 條 | stripe; article, section | tiáo | ㄊㄧㄠˊ | 315 |
| 0003 | 例 | regulation; custom; example | lì | ㄌㄧˋ | 332 |
| 0004 | 法 | law; method | fǎ | ㄈㄚˇ | 175 |
| 0005 | 理 | reason; principle; to arrange | lǐ | ㄌㄧˇ | 331 |
| 0006 | 調 | to mix; to regulate | tiáo | ㄊㄧㄠˊ | 315 |
| 0007 | 有 | to have; etc. | yǒu | ㄧㄡˇ | 1138 |
| 0008 | 井 | a well; a system | jǐng | ㄐㄧㄥˇ | 511 |
| 0009 | 然 | –wise (a suffix or a connective) | rán | ㄖㄢˊ | 853 |
| 0010 | 台 | a platform; a stand; etc. | tái | ㄊㄞˊ | 274 |
| 0011 | 窪 | a pit, a hollow | wā | ㄨㄚˉ | 1252 |
| 0012 | 哇 | (the sound of crying) | wā | ㄨㄚˉ | 1252 |
| 0013 | 坑 | a pit, a hole | kēng | ㄎㄥˉ | 425 |
| 0014 | 叫 | to call, to emit sound | jiào | ㄐㄧㄠˋ | 490 |

+These are decimal number codes arbitrarily assigned, for the sake of illustration. Approximate ranges of the codes: character codes 1–10,000 and morpheme codes 1–1280.

24
18
I II 24
26
I II 28
32
I II III 28
34
I II III IV 30
36
I II III 38
42
I II III IV 40
44
I II III

OPTIONAL
PROGRAM FLOWCHART FOR THE CPU
FOR THE CODE CONVERSION -- ONE-STRING ALTERNATIVE

METHOD AND DEVICE FOR PHONETICALLY ENCODING CHINESE TEXTUAL DATA FOR DATA PROCESSING ENTRY

This is a continuation of application Ser. No. 06/551,555 filed Nov. 14, 1983, now abandoned.

SUMMARY OF THE INVENTION

The invention discloses a new method of coded entry of Chinese character text data into any electronic data processing, communication, display, printing, etc. system, and an electronic keyboard suitable for the method. The keyboard has keys for entering, according to a phonetic notation of a chosen Chinese dialect, all the phonetic data of the characters making up the text, and some "character position keys" with special function in the encoding process.

Each coded composite keyboard signal generated at the end of a typing sequence (corresponding to one block of characters in the text) can itself serve as the intended specific coded signal identifying the character(s) in that block. these signals can also be further converted, one by one, by conventional computer operations into those signals coded in the "character codes" required by text processing system into which the data entry is made.

Apart from optional shortened typing sequences for encoding some categories of frequent characters, the operator encodes the text character-block by character-block, where a block may contain one or more characters. If a block is phonetically unique, the encoding is effected simply by entering on the keyboard the phonetic data of the block. If a block is phonetically not unique, the operator first enters the phonetic data of a longer block which is commonly used in Chinese, is phonetically unique, and contains the block to be encoded, and then, as the final step of the same encoding typing sequence, he enters on the "character position keys" the position(s) which the character(s) of the block to be encoded occupy in that longer block.

In an alternative embodiment, an acoustic speech sound analyzer substitutes for the functions of the phonetic data keys, or even for those of the special function keys, of the keyboard.

FIELD OF THE INVENTION

The present invention relates to methods and equipments for encoding texts written in Chinese characters, in particular to those that use an electronic keyboard for the encoding. The encoding can also be called data entry when the data are characters or words of a text, and it consists of generating by the keyboard sequentially coded electronic signals, or strings of signals, each uniquely representing one or several of the Chinese characters making up, in sequence, the text which is to be encoded.

Related inventions have been found, mainly, under the following U.S. patent classification classes and subclasses: 178/30; 340/365R; 364/419; 400/83; 400/110; 400/484.

BACKGROUND OF THE INVENTION

With the great development of the information and communication industries in the last decades there has arisen a growing need for fast, accurate and versatile mechanical processing of written material in all the major languages. As to processing Chinese texts with the same speed and accuracy as has been achieved with many alphabetic texts, the greatest obstacle has been the well-known fact of the great number and complexity of the Chinese characters. Apart from only historically used characters, modern Chinese still uses about 8-10,000 characters, with 3-4,000 in everyday use.

The decoding of these characters, that is, the converting (back) of already generated electronic signals structured by a given system of character codes into the original visual forms of the characters (on CRT screens or by various types of printers at computer output terminals), as this can be done completely mechanically, has been the lesser problem, and at present there are already several quite satisfactory methods and equipments available for this purpose.

The encoding of such characters, however, has to be done by human (intelligent) operators, and the finding or devising of fast and accurate ways of encoding Chinese characters has been a persisting problem, as the great number of various attempts in the filed, proposed year by year even up to now, clearly shows. The present invention also addresses this problem, and its overall object is to devise an encoding method (and a keyboard or other equipment suitable for the method) that is more congenial to the peculiar features of the Chinese language and therefore easier and faster than those in previous art.

IN almost all the encoding systems used or proposed so far, the data that are entered on a keyboard are graphic or visual, usually graphic component parts of the characters, by which a classification or indexing of the characters is attempted. The great variety of these graphic components and of their location in the character wholes, however, makes it difficult to achieve a complete and yet not too complex classification. A few of the existing or proposed systems also use the phonetic data (the pronunciation) of the characters, in most of such cases the phonetic data being used together with the graphic data, in particular when the encoding takes place in two steps, the phonetic data to be used in the first or the second step.

No encoding system, it seems, has been proposed so far which would use merely the phonetic data. The reason for this is that, while the number of written characters is great, the phonetic "repertoire" (more exactly, the number of speech morphemes) of any given Chinese dialect is rather limited, and therefore homophone characters, different characters with exactly the same pronunciation, are very numerous in Chinese.

Equally important is, however, the fact that especially in the last 30-40 years much has been done by educational and cultural institutions to standardize the pronunciation of Chinese, in particular that of the official language, Mandarin Chinese. Almost all literal Chinese educated in the last 30-40 year know the "official pronunciation" of Mandarin Chinese and are moreover familiar with one or another (chinese-style or alphabetized) system of phonetic notation or symbols by which the pronunciation is written down. The availability of standard phonetic notations, and the realization that there are speech patterns, explained below, by which Chinese characters can uniquely be defined, are the grounds for the further object of the invention to devise an encoding system based on phonetic data alone.

In the encoding systems proposed so far, whatever kind of data or keyboard they use, Chinese characters are identified and encoded singly, as discrete units, one by one. These methods try to find certain characteristics "inside" each character by which it can be distinguished from every other character. It is true that most Chinese characters in their origin have been ideographs, self-contained graphic representations of things or ideas, and there are grounds for treating and identifying them singly, in themselves. But in modern Chinese, especially in a running text, written sentence by sentence, the characters appear in groups or blocks, largely following the grammatical patterns of the spoken language. What we see in a modern Chinese text is not simply a row (or column) of individual characters but more often groups of characters, easily identifiable two- three- or four-character blocks, following one another. A further object of the invention is to utilize this feature of modern Chinese texts and make it a rule to encode Chinese characters, at least most of them, in principle, as blocks of characters, not one by one. The problem, then, of resolving the ambiguity of homophone characters shifts to that of homophone character blocks, which are very few in Chinese. And the still remaining ambiguities among homophone character blocks can be resolved and the desired characters identified by a method imitating a certain speech pattern in Chinese.

Careful speech in Chinese is most of the time unambiguous because in speech there is even more frequent use of longer blocks or strings of speech morphemes, paralleling the blocks of characters mentioned above, the meanings of which in most cases are unambiguous. Moreover, there are several speech patterns widely used by literate speakers of Chinese whenever the necessity arises to identify to the listener a certain Chinese character or characters. In the most common pattern, the speaker pronounces a longer string of speech morphemes (an expression of several syllables) which uniquely define a block of Chinese characters of the same length, and then he indicates that the character in question is the first, the second, the third, etc. among the characters in the longer expression just pronounced. The speech pattern is very common among literate speakers of Chinese, and a further object of the invention is to make use of this pattern as well, formalize it, extend its scope, and make it also one of the encoding rules whenever character blocks that have homophones are to be encoded.

A still further object of the invention is to provide, within its scope and the method described, an alternative embodiment in which an acoustic speech sound analyzer (a preliminary speech sound encoder) substitutes for the functions of the phonetic data keys, or even for those of there keys, or the keyboard, This speech sound analyzer is programmed to produce, after recognizing the individual speech sounds or whole speech morphemes, specific electronic signal strings that have the same distinctiveness and therefore the same identifying force as those which the actuation of the respective keys on the keyboard would produce. The limited speech morpheme rage of the Chinese dialects actually makes their speech sound analysis much easier than that is in the case of most other languages.

As conceived in the preset invention, the encoding is done essentially at the keyboard by a variety of specific sequences of keystrokes, on speech sound keys and other specific function keys, defined by the encoding rules (or by the articulate reading-in of the pronunciation of Chinese characters and actuation of some special function keys, all in specific sequences, if the acoustic speech sound analyzer embodiment is used). The sequentially coded signals generated by the keyboard (or those generated by the speech sound analyzer) are in ever case specific enough to uniquely identify the character or characters to be encoded. The method and equipment disclosed in this invention have been designed to achieve this end; this end and also defines the proper scope of the invention.

It is understood, however, that the keyboard (or the speech sound analyzer) is only a part of the whole data entry apparatus. That is, the invention relates only to a part or a stage of the whole data entry process.

In almost every practical application of the invention, the coded keyboard signals will have to be subsequently converted or translated, one by one, into another set of signals coded in the "character codes" (specific signals for each different Chinese character) used in that particular word processing, communication, display, printing, etc. equipment into which the data entry is made. This code conversion can be done, for example, by the conventional operations of an electronic data process system (computer) appropriately programmed and provided with a memory section with a sufficiently large number of memory locations which are identifiable by the keyboard signals and in which the pertinent (finally required) "character code" data are stored. When the computer receives from the encoding keyboard one of the many previously determined possible coded signals, this signal serves as a memory address identifier, and then the computer's control section finds the address thus identified, retrieves the information previously stored there—which is one or several "character codes" (in the present method it is possible to encode more than one character by just one keystroke sequence)—and feeds this character code information into the equipment which the data entry is made.

It is essentially that the keyboard signals be specific enough so that they could be unambiguously converted into another set of signals structured by one or another kind of "character codes", but whether or not these keyboard signals are converted and by what kind of computer operations such a code conversion is accomplished lie outside of the scope of the invention, as are the mechanical details of the keyboard or of the above mentioned speech sound analyzer.

It is, finally, also an object of the present invention to accomplish the encoding in one step. According to the method and equipment described here, there remains no ambiguity (requiring further steps to resolve it) as to which character or characters are encoded once one sequence of keyboard actuations has been completed. Ideally, therefore, the encoding is very fast. At the same time, it must be noted that in using this method and equipment a rather high level of literacy in Chinese, familiarity with character combinations in the language, and knowledge of the exact pronunciation of the characters is required on the part of the operators. Even well qualified operators may occasionally have to look in a dictionary or some character index or manual, as a previous step, before entering the data on the keyboard, but such occasions will be rare. To avoid mistakes in the encoding, the invention allows (and would even recommend) the use of a control monitor CRT screen which immediately displays to the operator the just encoded characters, but this is not an essential part of the equipment disclosed here.

In an overall assessment, the present invention requires a rather high level of literacy in Chinese on the part of the operator, but on the other hand it incorporates several important features of the Chinese language not utilized in prior art, and so it offers a new text-encoding tool faster, easier and more congenial to the language than other methods. Text data entry with this method and equipment is, in an way, like one literate speaker of Chinese "talking" to another. Also, this method and equipment can be a very convenient tool when one is encoding a text not yet written but to be freely composed at the keyboard. One can encode characters with this method even if he does not know (or is not sure of) their exact graphical composition, provided he knows their pronunciation.

Below is a detailed description of the encoding method and equipment. Some points of the description are clarified by drawings accompanying the text.

BRIEF DESCRIPTION OF THE DRAWINGS

FIG. 3 is a table showing selected Chinese characters, used as samples in the description, with their phonetic and morphemic data in Mandarin Chinese;

DETAILED DESCRIPTION OF THE PREFERRED EMBODIMENTS

Figure 1A:
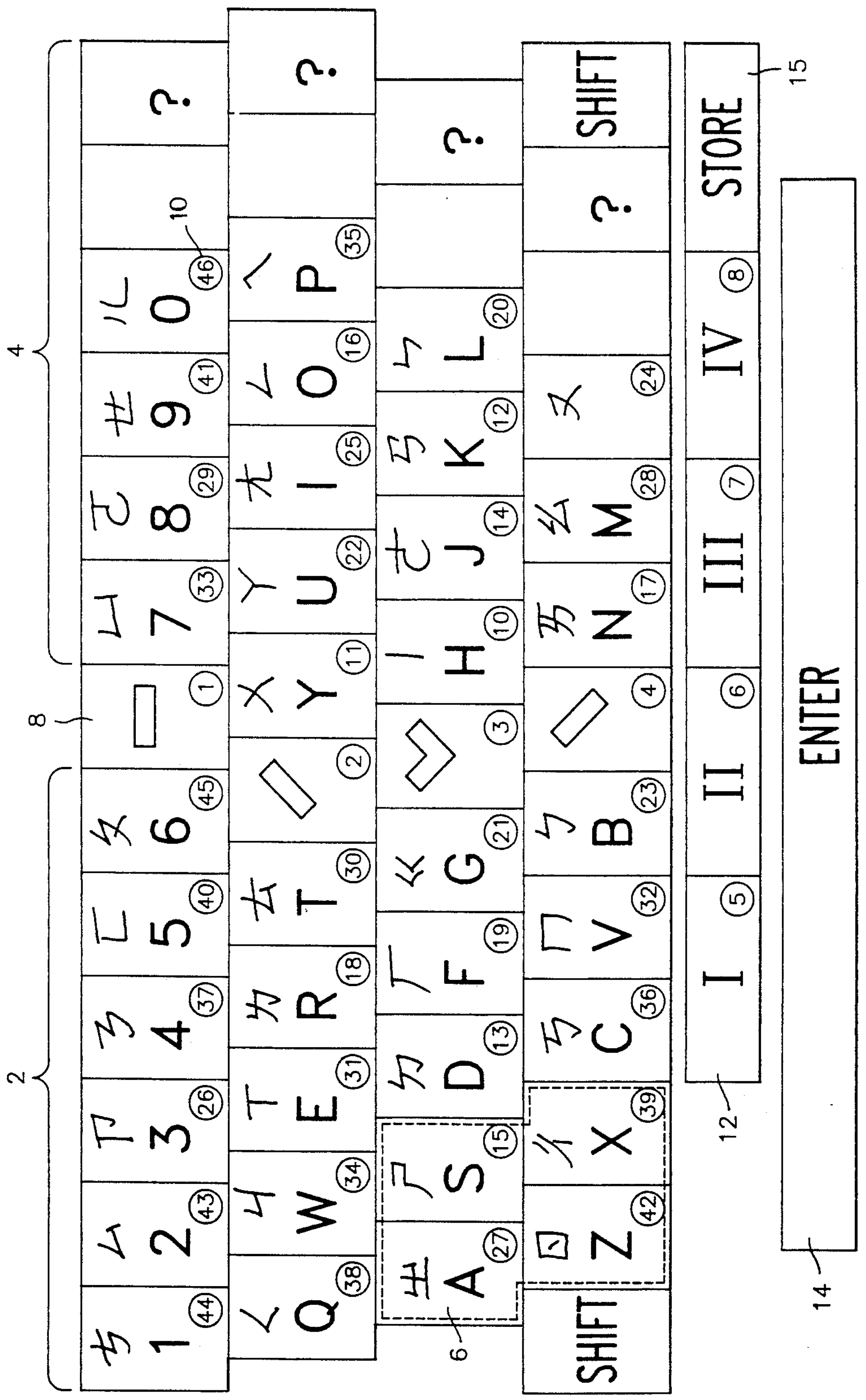
FIGS. 1*a* and 1*b* are schematic representations of the preferred embodiments of the new keyboard arrangements designed for encoding Chinese texts in the Mandarin Chinese pronunciation.

Phonetic Data, Phonetic Notations, and the Encoding Keyboard

In one of the two alternative embodiments of the present invention, the equipment used for encoding is an electronic keyboard on which the operator enters the phonetic data of the characters. In much of the following description of the encoding rules this first embodiment is kept in mind. The other embodiment will be mentioned toward the end of the description.

The first encoding rule, using the keyboard version of the equipment, can be formulated as follows:

Rule 1: IN THE PROCESS OF TEXT ENCODING, THE ENTRY OF THE PHONETIC DATA OF A CHINESE CHARACTER IS DONE FIRST BY ACTUATING, ON ANY SUITABLE KEYBOARD, IN THE ORDER OF THE PRONUNCIATION, THE KEY(S) BEARING THE PHONETIC SYMBOL(S) OF THE INDIVIDUAL SPEECH SOUND(S) MAKING UP THE PHONETIC SYLLABLE WHICH IS THE PRONUNCIATION OF THAT CHARACTER, AND THEN ACTUATING THAT ONE KEY, FROM AMONG THE KEYS BEARING THE TONE QUALITY SYMBOLS, WHICH CORRESPONDS TO THE TONE QUALITY OF THAT SYLLABLE, ALL ACCORDING TO ANY GIVEN STANDARD PHONETIC NOTATION SYSTEM OF ANY CHINESE DIALECT CHOSEN FOR THE TEXT ENCODING.

The individual speech sounds are what are commonly referred to as consonants, vowels, etc. in a spoken language. In all Chinese dialects, the pronunciation (reading out) of a character always constitutes a phonetic syllable, made up of one or several individual speech sounds. In Chinese, the individual speech sounds can be divided into two groups: the so-called "initials", which always stand at the beginning of a phonetic syllable (or stand alone if no other speech sound follows them) and the socalled "finals", which always stand at the end of a phonetic syllable (or stand alone if no other speech sound precedes them). Three of the speech sounds are usually "finals", but sometimes they can occupy a middle position between an "initial" and a "final"; these three are also referred to as "medials".

In every Chinese dialect each phonetic syllable has, in addition, a definite "tone", a characteristic syllabic intonation (pitch change) pattern. A given combination of an initial and a final, for example, can be pronounced in a number of different tones, each of these tones making that combination a different word (or word-component, and therefore a different speech morpheme) in Chinese. the number of tones varies according to the dialects; Mandarin Chinese, for example, has four tones. It is clear, then, that these tone qualities are among the relevant phonetic data in Chinese and they must also somehow be entered on the keyboard.

There are various phonetic notations (phonetic symbols) for visually representing the individual speech sounds and the tone qualities in a given Chinese dialect, and the present encoding method is not restricted to any of them; in principle any of them can be used. Some phonetic notation systems use the letters, or groups of letters, of the Roman alphabet to represent Chinese speech sounds; the so-called pinyin system, now widely used on the Chinese Mainland, is one of them. There is also a notation system which uses Chinese-style symbols for the speech sounds; it is called the (Chinese) National Phonetic Alphabet, developed more than 50 years ago and widely used, especially in the last 20–30 years, in Taiwan and other areas with Chinese speaking populations. Both the pinyin system and the National Phonetic Alphabet are phonetic notations for the offical Mandarin Chinese. these are the most important phonetic notations in current use, but, for example, Cantonese and Taiwanese Chinese also have already standardized respective alphabetic phonetic notations, and either of these can also be used, in principle, in encoding texts with the present method.

In all the notation system there are also special symbols for the tone qualities. Most commonly, the shapes of these symbols are graphic imitation of the pitch changes in the phonetic syllable; for example, a level pitch is marked by a short horizontal line, a falling-rising pitch by a broken (v-shaped) horizontal line, etc. As to their position, the tone marks are either superscripts in some of the alphabetic notations or index numbers or symbols (affixed to the upper right-hand corner of the main phonetic symbol string) in other alphabetic or in the Chinese-style notation.

The individual speech sounds, according to Rule 1, are to be entered on the keyboard in the order in which they are pronounced. The tone qualities, however, have the special characteristic of being inherent to the whole phonetic syllable, and so there is no immediately evident place for them in the sequence of the phonetic data as they are entered on the keyboard. Rule 1 requires (arbitrarily) that the tone quality data are entered immediately after the individual speech sound data, for each syllable. But this is not an essential point in the method here described; no change needs to be made, in principle, in the encoding method if the tone quality data are regularly entered somewhere else in the sequence.

The present invention does not specify the particular markings of the keys or the number and the arrangement of the keys on the keyboard on which the operator effects the encoding, using the present method. In most respects, the keyboard can be a conventional alphanumeric electronic keyboard or computer input terminal, or a slightly altered version of any kind of such keyboards. And the keys of the keyboard generate sequentially (linearly) coded electronic input signals and command signals in the conventional manner. To be used for the encoding method described herein, and so to be within the scope of the invention, it is required and sufficient that the keyboard contain (1) keys, used individually or in combinations, or the entering, according to a chosen standard phonetic notation system, the individual speech sound data of a Chinese dialect, (2) keys for entering the tone quality data, and (3) a set of "character position keys" with special function in the encoding (explained below). These character position keys can be either in the same general area where the other keys are located or in a different area, constituting a separate (smaller) keyboard section; because they are often used, it is preferred that these keys are integrated into the main keyboard, but this is not essential.

"Keyboard" in this description, in most places, just means "any suitable keyboard" which satisfies the three criteria above but the other details of which are not specified or restricted. But, in addition, the present invention also discloses two new designs for keyboard arrangement for phonetic data entry, and therefore also for encoding Chinese texts, in the Mandarin Chinese pronunciation. In the immediately following section and in some later sections, as the context makes it clear, "keyboard" will mean one or the other of these keyboards with special, new key-arrangement. These new key-arrangements for a phonetic data entry keyboard are in many respects different from those found in prior art, and they are viewed as ones optimally satisfying the needs for a fast and accurate typing action when data entry is to be effected in the Mandarin Chinese pronunciation, either for text encoding or for other purposes.

The preferred embodiment of one of the new keyboard arrangements for phonetic data entry in Mandarin Chinese is schematically illustrated in FIG. 1*a*, where each square represents a key. its characteristic features are the following. The majority of the keys, divided into two sections, 2 and 4, are the keys for entering the individual speech sound data. Each of they keys bears two symbols that can serve as phonetic notation: one is a symbol of the Chinese-style National Phonetic Alphabet (altogether 37 symbols) and the other a letter of the Roman alphabet (or on some keys an Arabic numeral) so that the operator can do the encoding using either of these notation system, whichever he is more familiar with. It is irrelevant whether the Chinese-style symbol or the letter of the alphabet is placed above the other on the individual keys.

The arrangement of the letters of the Roman alphabet is the same as that on a standard English typewriter, but in situations in which the operator would be more familiar with another kind of alphabetic keyboard this could also be the arrangement of a standard Spanish, French, etc., or even Greek or Russian, keyboard. The underlying reason is not to require from the operator to learn a new typing technique: as to typing the letters of the alphabet, he can make use of the typing technique he already has.

The Chinese-style phonetic symbols are arranged this way. In the left-hand half of the board (2) are the symbols for the "initial" speech sounds, placed so that (based on a careful count) the more frequently one is used the nearer it is placed to the center of the keyboard and the nearer to, or on, the row of keys on which the operator's fingers rest. Effort has also been made, moreover, to place the symbols of the initials of the same phonetic category (e.g. bilabials, dentals, palatals, etc.) near or contiguous to one another, forming certain blocks or patches on the keyboard, optionally to be further distinguished by slightly differently colored key-tops for each group. In FIG. 1*a*, dashed lines 6 indicate one of these groups. This arrangement can help the operator familiar with the Chinese-style phonetic symbols because whenever these are listed, as when they are taught in school or arranged in a dictionary, they have a fixed order (like that of the letters of an alphabet) and within the order they are grouped according to their phonetic categories.

In the right-hand half of the keyboard 4 are the symbols of the "final" speech sounds, again so placed that the more frequently one is used the nearer it is to the center of the keyboard and the nearer to, or on, the base row for the fingers, with the "medials" (those with key code numbers 10, 11 and 33) nearest to the center. Attention has also been paid to place the symbols of phonetically similar speech sounds together, though here the groupings are not so evident or helpful to the operator as they are on the left-hand half, and need not be further distinguished by color coding.

In the center of the keyboard, arranged in FIG. 1*a* more or less vertically, are four keys 8 marked with symbols of the four tones in Mandarin chinese. these are to enter the tone characteristics of the phonetic syllables. In this keyboard design, that these tone keys are arranged vertically (as shown in FIG. 1*a*) is not essential; what is essential is only that they are placed at the center of the keyboard, because these are the most frequently used keys. It will also be seen in FIG. 1*a* that the tone keys are additional to the speech sound phonetic symbol keys, and thereby the standard alphabetic arrangement, otherwise retained, is in one respect altered: a gap corresponding to one key (or possibly two keys) is introduced between the left-hand operated and the right-hand operated keys. Operators, however, can easily adjust to this small change and no new typing technique has to be learned.

Preferably the operator strikes the tone keys always with his left-hand index finger. Thus most of the time the encoding of a phonetic syllable consists of a strike with a left-hand finger, followed by one or two strikes with right-hand fingers, and finally another strike (on a tone key) by the left-hand index finger. To achieve this convenient alternate use of fingers of the two hands has been one of the guiding principles in designing the keyboard.

In the lower right-hand corner of each square representing a speech sound key or tone key there is an encircled number 10, which here is just an arbitrary decimal-number key code, a numerical equivalent to that (binary) coded signal that the actuation of the key generates. (Attention has been paid, nevertheless, to the relative frequency with which each of these keys are used, and the code numbers have on the whole been assigned in the order of frequency, with the most frequent ones having the lowest codes later in the description when examples for encoding are given. Empty square are for punctuation and other marks or symbols; those with a question mark in them are optional keys in case more are needed.

Figure 1B:
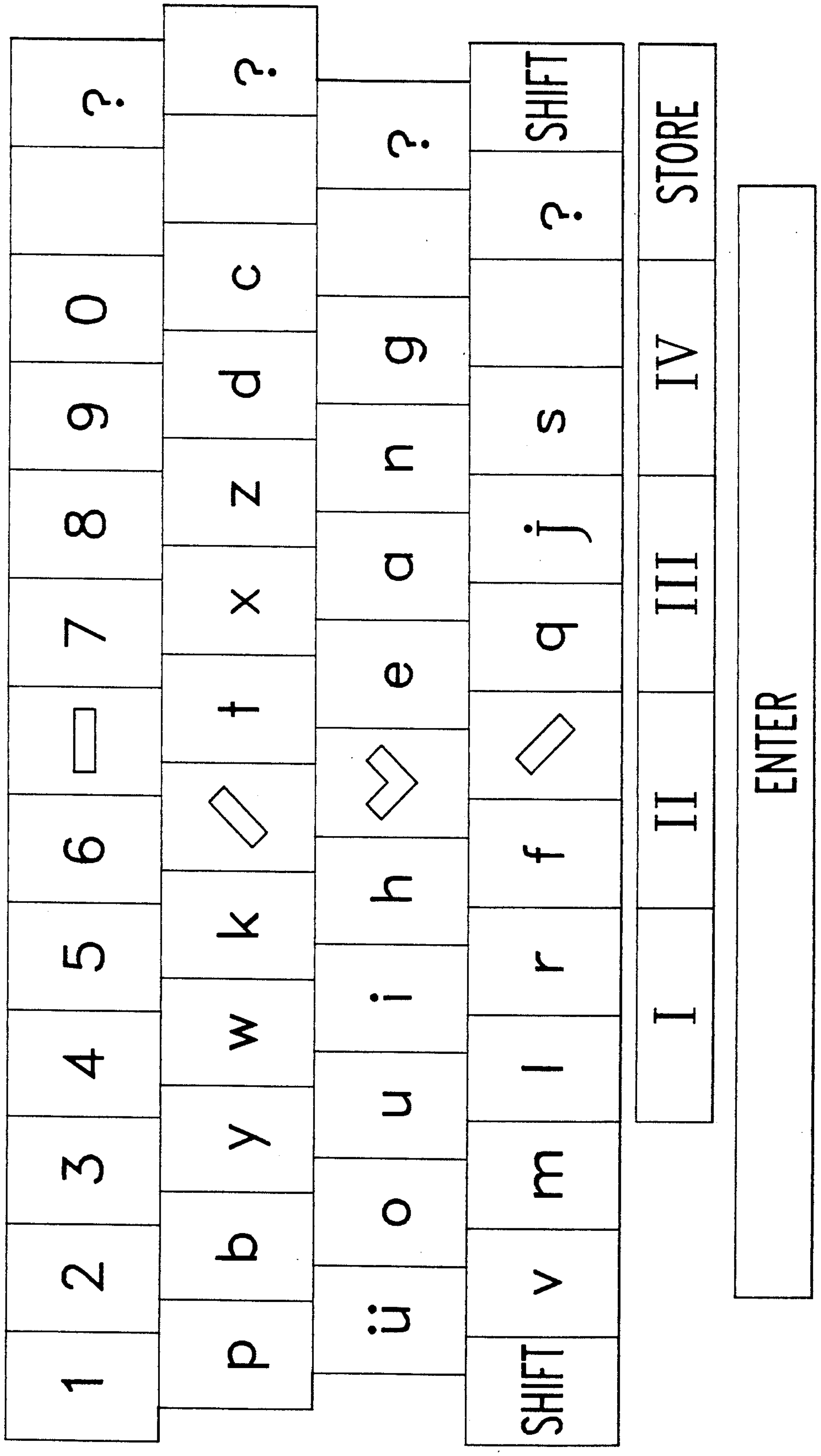

FIG. 1*b* discloses the preferred embodiment of another keyboard arrangement, designed especially for conditions in which the keyboard is used only or principally for Chinese text data entry by the pinyin phonetic notation (or romanization) system now in official use on China Mainland (People's Republic of China). Besides its use as an encoding keyboard for texts written in the traditional Chinese characters, such a keyboard arrangement can also be adopted for an ordinary Roman-alphabetic typewriter for typing Chinese in pinyin romanization.

The characteristics of the arrangement shown in FIG. 1*b* are as follows. The keys bearing the letters of the alphabet are arranged in three rows as on a conventional typewriter for Western alphabetic writing systems. (The letter v is not used in the pinyin notation, but it can still be retained, and given a key, in case some other texts, not the pinyin notation, is to be typed on the keyboard.) The speech sounds that constitute the syllable "finals" in Mandarin Chinese-that is, the vowels, especially a, i, o and u, and the two consonants n and g-appear in a great variety of combinations (ai, ia, ao, ou, iu, ui, an, na, in, ni, ang, ing, ong, etc.), so the keys bearing them have been so arranged that each is usually struck by a different finger; this way the repeated use of the same finger when typing is in almost all cases eliminated. The same keys, bearing the letters for syllable "finals" are also the most often used ones, and they are all placed on the middle row, where the fingers usually rest. As to the keys for the syllable "initials", based on a frequency count, the most frequently used ones will usually be struck by the index fingers, the second most frequently used ones by the middle fingers, and the rest by the ring or small fingers, of either hand. the keys bearing the four tone symbols—as in FIG. 1*a*—are placed in the center of the keyboard, preferably vertically, as shown, but they can occupy other relative position as well, as long as they are in the center.

Later in the description, the various ways of encoding will be illustrated with reference to the new design of keyboard arrangement shown in FIG. 1*a*. But, as has been said, the scope of the invention includes encoding on any keyboard design or arrangement satisfying the three main criteria listed earlier.

Figure 2:
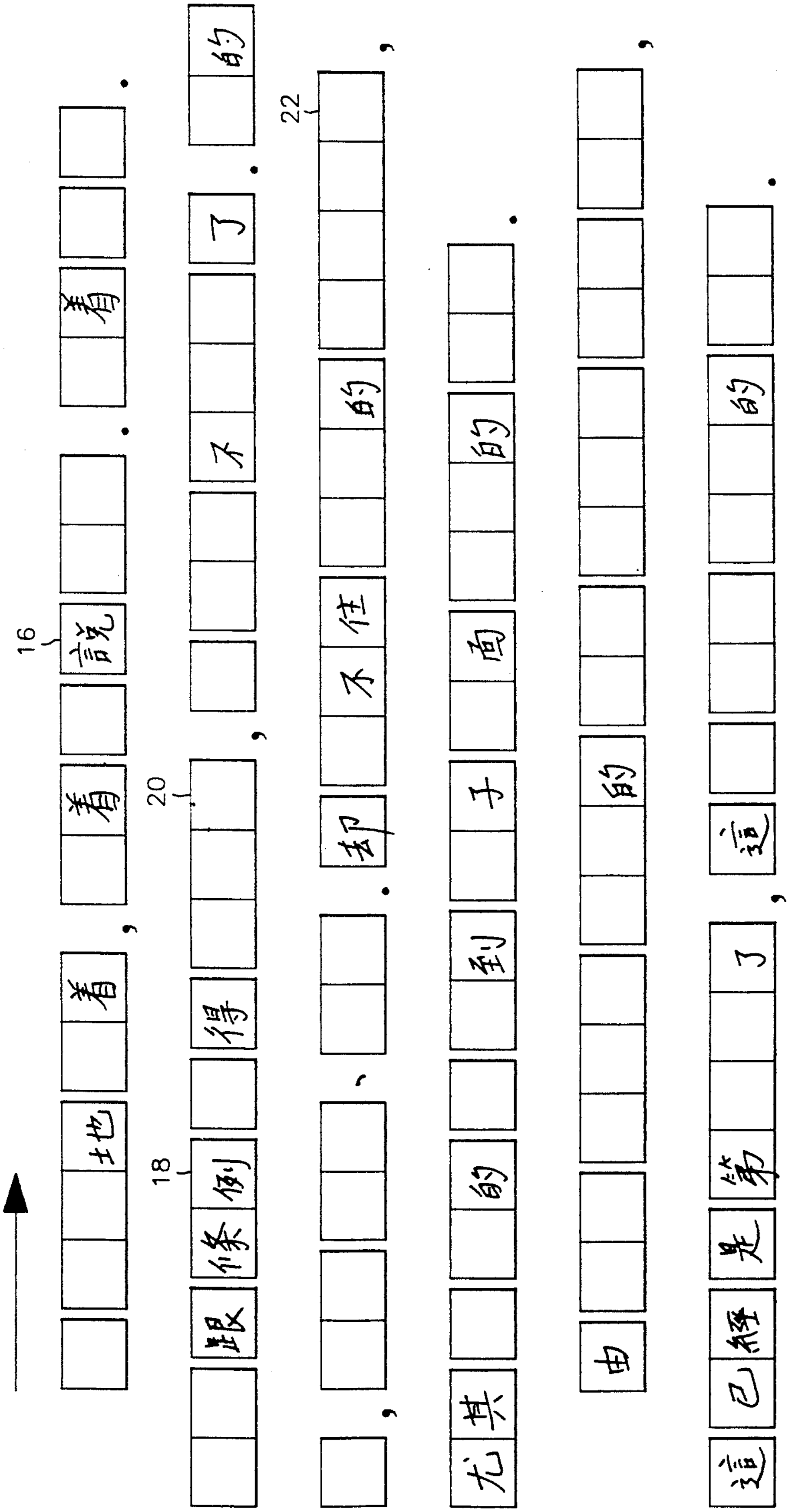
FIG. 2 is a schematic representation of the distribution of "content" and "function" characters in a sample Chinese text.
Figure 6A:
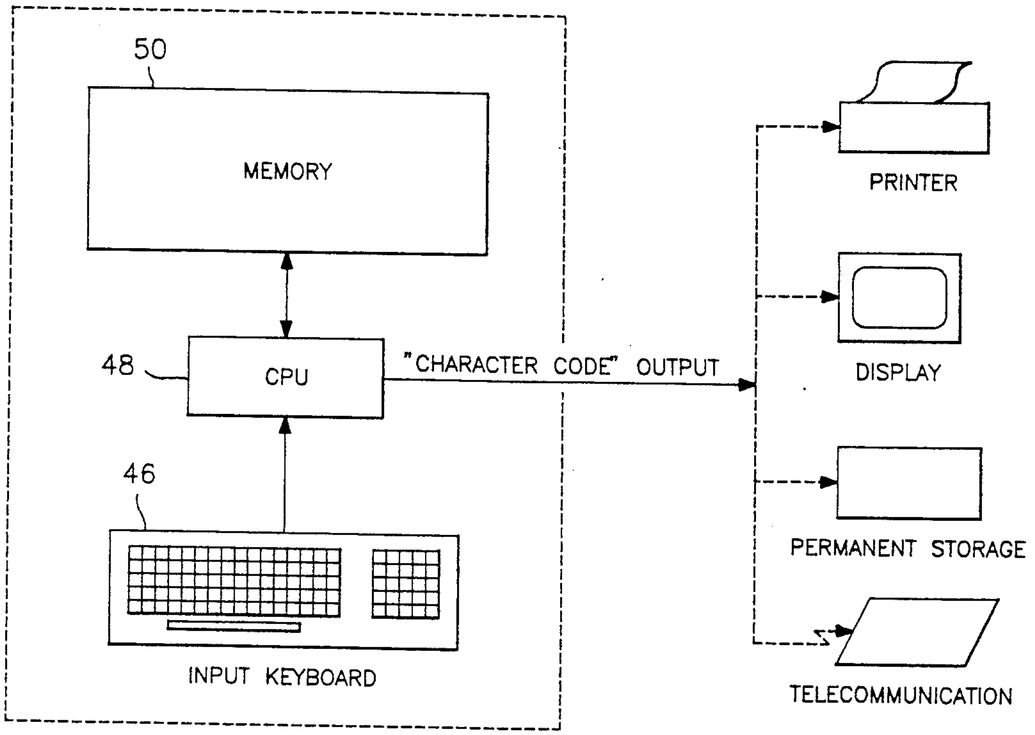
FIGS. 6A and 6B are system block diagrams which show the basic input, output, processing and storage components of the present invention, in two different embodiments.

In FIG. 6A, a block diagram shows the elements which make up an embodiment of the present invention in the case in which only a keyboard is used for data entry. The electronic input keyboard 46 has been described above. The CPU 48 can be that of any type or make of a conventional electronic data processing device (computer). The memory 50 is a bulk storage in which there is a memory location for each different keyboard signal string determined by the encoding typing method and in which the information stored at each location is the "character code" information for one or more Chinese characters. Encoding by Blocks of Characters In a Chinese text, especially in modern Chinese, two kinds of characters can be distinguished. One kind are those that carry the main meanings and can be called the "content characters"; they are roughly equivalent to the nouns, verbs, adjectives and adverbs in other languages. The other kind of characters perform most often, only certain grammatical functions in the sentences and can be called "function characters"; they are again roughly equivalent to the conjunctions, auxiliary verbs, linking verbs (copulas), verb-, noun-, adjective- or adverb-endings, prefixes, suffices, prepositions, etc. in English and other Indo-European languages. FIG. 2 schematically illustrates the distribution of these two kinds of characters in a sample Chinese text. The squares or blocks drawn in heavy lines indicate content characters, and those drawn in fine lines the function characters, with all the function characters and some of the content characters filled in.

In reality, especially in a printed Chinese text, there are no such gaps or spacings between characters that appear in FIG. 2; all characters are written or printed equally close to one another, the only gaps being the occasional punctuation marks. In the eyes of anyone, however, who can read Chinese, especially if he is an experienced reader, the characters do "group together" or "separate" just as it is indicated in FIG. 2.

The new encoding method in the present invention concerns itself basically only with the encoding of the content characters. The function characters make up only a small group of about 50–100 different characters, their number depending on the interpretation of what makes a character a "function character". For the encoding of the function characters-as it is done in several other encoding systems-special, optional, short-cut or irregular encoding processes can be set up (and special memory locations prepared in the connected code converter computer accordingly) whereby, for example, disregarding their possible homophones (other characters with the same pronunciation), the entering of their phonetic data alone, or even just part of their phonetic data, generates special short keyboard signal strings that can be immediately converted by the computer into the desired signals carrying the corresponding character codes. As these function characters are few, the operator can easily remember and recognize them in the text, and he will know when to employ such special shortened encoding steps. No particular or new short-cut method is, however, disclosed here, in this description, for the special handling of function characters or other categories of commonly occurring characters. The encoding method disclosed here, as has been said, concerns itself basically only with the encoding of the content characters, which to be sure constitute the large majority of the characters in any text. And every character, even function characters, whenever necessary (for example, when any of them appears in isolation or when no optional short-cut encoding method has been set up), can be encoded with this new method as a content character, without short-cuts.

The second major rule of the encoding method presented here can be formulated as this:

Rule 2: WITH THE FUNCTION CHARACTERS AND SOME OTHER CATEGORIES OF FREQUENTLY OCCURRING CHARACTERS AS OPTIONAL EXCEPTIONS, CHARACTERS ARE ENCODED IN BLOCKS, ALWAYS ONE BLOCK BY ONE UNINTERRUPTED TYPING SEQUENCE.

The length of the blocks varies, as it depends on the text. FIG. 2 can again be inspected to see the various lengths of the blocks in a sample text. A border case, though not an uncommon case, is when a block contains only one character. More frequently it will contain two characters, and less frequently three or four characters. Though the present method does not limit in principle the length of the blocks, the length of the content character blocks rarely exceeds that of four characters, and practically all of such long blocks can clearly be divided into meaningful constituent parts, that is, into smaller blocks, and encoded separately.

It is therefore important for the operator using this method to know which content characters in Chinese do form a block and which do not, and yet it is not possible, or necessary, to state here the exact conditions under which characters constitute a "block" in the sense used in Rule 2. The most common and practical criterion of what makes a group of characters a "block" would be that they together express just one single meaning (refer to one idea, one action, one thing, etc.). In most cases, one block when translated into an alphabetic language would there be just one word (simple or compound word). Again, it could be said that a group of characters would be a "block" if it would qualify to be a dictionary entry in a Chinese dictionary. Sometimes only the fact that certain characters are very frequently used together would qualify them to be treated as a "block". To define the nature and the limits of such blocks is a linguistic problem. In describing the encoding method of the invention it is not necessary to give such definitions; it is enough to point to the unquestioned existence of such blocks in both spoken and written Chinese and state how to treat them when encoding.

Even if different operators judge the same groups of characters differently, no ambiguities will arise in the present encoding system. For example, in the list of characters in FIG. 3, Characters 0001 and 0005, when they appear in a text one after the other in this order, could be judged by some a true "block", but because this combination is not frequent some might take Character 0001 as a single-character block being a verb and Character 0005 as another single-character block being the verb's object and encode the two characters accordingly as two blocks. If the encoding follows the rules stated below, the resulting coded keyboard signals in the two cases will be different, but in both cases these signals will equally unambiguously effect the encoding, uniquely identifying a two-character block (made up of Characters 0001 and 0005) in the first case or identifying two single-character blocks (Character 0001 and Character 0005), one after the other, in the second case.

In view of such possibly different interpretations on the part of the operators as to which characters form a block, it is necessary that, if the keyboard signals are to be further converted by a computer into signals carrying the character codes, corresponding memory locations be set up in the computer memory for the respective varieties in the encoding. But this does not mean that an indefinitely large number of additional memory locations would be needed. For most blocks the operators' interpretations will be uniform, and in these cases one memory location for each is enough. Only for the remaining much smaller number of cases will it be necessary to set up two or three locations for each case.

In encoding every block there are two possibilities. (1) The first possibility is that there is no other character block in chinese that has the same pronunciation, in the dialect in which the encoding is done, as the block to be encoded. In this case, the individual speech sounds and the tone quality (or qualities) of the character(s) forming the block, and likewise these phonetic data entered on the keyboard and the resulting keyboard signal string, can by itself uniquely identify the block and the character(s) in it. (2) The other possibility is that there is or are other blocks in Chinese containing different characters but still having the same pronunciation as the block to be encoded; in other words, the block is one of two or more homophone blocks. And in this case the block's phonetic data alone cannot single it out from among its homophones.

Only approximate figures can be given for the relative frequency of occurrence of these two possibilities. Of the one-character blocks up to 80-90 percent would have homophones. But for the blocks containing two or more characters the situation is just the reverse: up to 90-95 percent of them are estimated to be phonetically unique, with no homophones, and for such blocks their phonetic data can serve as unique identifiers.

Encoding Phonetically Unique Blocks

The encoding of a phonetically unique block is straightforward in the present method, as formulated in the following rule:

Rule 3: A PHONETICALLY UNIQUE CHARACTER BLOCK IS ENCODED BY ENTERING ON THE KEYBOARD THE PHONETIC DATA OF THE CHARACTER(S) CONSTITUTING THE BLOCK ITSELF ONLY.

For example, in FIG. 2, Block 16, though a single-character block, is phonetically unique. The phonetic data of the character that constitutes this block can be inspected in FIG. 3, where the (arbitrary) character code for this character is 0001. To encode this block according to the pinyin phonetic notation, the operator strikes the keys marked "s," "h," "u" and "c" and then the tone key for the first tone (marked by a horizontal line). Finally he strikes the delimiter key, which indicates the completion of one encoding typing sequence and generates a command signal to input the complete sequence of the coded individual key signals, temporarily stored during one typing sequence, as one composite signal, one complete input, into the code converter computer, if such code conversion is required. FIG. 1*a*, at the bottom of the drawing, shows one of the possible different arrangements of the character position keys marked with Roman numerals 12 (which will be discussed later) and the keyboard's space bar 14. In this arrangement, besides its usual function, the space bar also serves as the delimiter key whenever the keyboard is used for encoding a Chinese text; so that space bar is here marked with the letters ENTER.

The specific encoding typing sequence for Block 16, encoded in the pinyin notation, is then (16a-type)s-h-u-o-1-ENTER.

FIG. 1*a* also shows the decimal-equivalent code numbers 10 assigned to each key and standing for that (binary-numerical) coded signal that each key generates. The encoding typing sequence for Block 16 displayed above can then also be written a signal string in numerical codes (16a-num) 15-10-22-16-1-ENTER.

If the operator uses the Chinese-style National Phonetic Alphabet notation system (the phonetic symbols for Character 0001 can be inspected in FIG. 3), the resulting signal string in numerical codes will be (16b-num) 15-11-29-1-ENTER.

(The letters "a" and "b" in the designation of the string refer to the encoding done in the pinyin and the Chinese-style notation respectively.)

Each of the generated keyboard signal strings, whether coded as (16a-num) or as (16b-num), can uniquely define a memory location in the memory section of the code converter computer, and the computer can call up the information, the character code, previously stored in these locations. Here, for Block 16, from either of these locations the same single character code, 0001, is called up.

As another example, Block 18 in FIG. 2 is a two-character block and is also phonetically unique. The two characters making up this block are Characters 0002 and 0003 in FIG. 3, and their phonetic data are also listed there. Encoding this block the operator again types in the phonetic data of the whole block. In the pinyin notation the encoding typing sequence is (18a-type) t-i-a-o- 1 -l-i- 1 -ENTER which will generate the keyboard signal string in numerical codes (18a-num)30-25-27-16-2-20-25-4-ENTER.

Or, when using the Chinese-style phonetic notation, the generated keyboard signal string in codes is (18b-num) 30-10-28-2-18-10-4-ENTER.

By either of these keyboard signals the same two-character block is defined and encoded, and either can identify a memory location in a code converter computer, the information stored in either of these locations being the same, a double character code, 0002–0003. (Whether that computer, further communication with a connected display, word processing, printing, etc. equipment, supplies this information as it is, a double character code input, or first breaks it up and then supplies it as two single character code inputs one after the other, is irrelevant for the present encoding method.)

And likewise, supposing that in FIG. 2 Block 20 (a three-character block) and Block 22 (a four-character block) are also phonetically unique, both are to be encoded by the same process as described for Block 16 and Block 18 above, only the keyboard signal strings for them being longer and the information stored in the memory locations (identified by the signals) in the connected code converter computer being a triple character code and a quadruple character code respectively.

The encoding method described so far, if it would refer to one-character blocks only, would not be new. But as it is here equally applied to blocks of two or more characters, it is definitely new, because it transcends the basic approach in prior art, in which the Chinese characters and data strings used to identify and encode them are treated singly, one by one. IN the present method, for example, a two-character block or a three-character block is each treated as just one unit in the writing system, as one complex unit (with a two-syllable and three-syllable pronunciation respectively, encoded by one typing sequence, generating at the keyboard one coded signal string, which in a connected code converter computer identifies one memory location, where the corresponding one (plural) character code information for each complex unit is stored.

In case the operator enters on the keyboard the phonetic data of a phonetically unique character block which has not been considered in preparing the memory files of the code converter computer and there is no memory address there corresponding to the keyboard signal for that block, the computer could, optionally, be programmed to generate a characteristic visual or audible signal (a light or a buzz) which lets the operator know this fact. He must then break up that block into smaller blocks, even up to a single-character block, and encode by smaller blocks for which it is expected that memory addresses have been prepared.

And in case the operator misjudges a phonetically not unique character block for being phonetically unique and encodes that block merely by its own phonetic data immediately followed by delimiter ENTER signal, the resulting signal string of individual key signals generated by the keyboard would be "incomplete" (that is, lacking one or more of the final components of the full string he should have entered, according to the encoding rule discussed next). In this case, again optionally, the code converter computer can be programmed so that it would recognize such signal strings as "incomplete" and generate a (different) visual or audible signal warning the operator that he would do the encoding again, typing in a correct full key sequence required in such a case. Further optionally, in this second case, memory addresses can be set up identifiable by these "incomplete" keyboard signal strings and in these addresses information stored and automatically displaced to the operator on an additional CRT screen, showing him various relevant character combinations from which he would see the right way of encoding the character blocking question. Such programmings could be very helpful, and they need not be too extensive because not any kind of misentry, only the typical and so forseeable "incomplete" entries, have to be covered. But for the data entry method described here such programmings are only auxiliary devices, not essential.

Encoding Phonetically Not Unique Blocks

The following, final, section of the encoding rules, concerning the encoding of character blocks that are phonetically not unique, presents again a completely new approach as it calls for the employment of mechanical devices (special encoding function keys) not used in other methods.

Rule 4: A PHONETICALLY NOT UNIQUE CHARACTER BLOCK IS ENCODED BY ENTERING ON THE KEYBOARD FIRST THE COMPLETE PHONETIC DATA OF ANY COMMON LONGER CHARACTER BLOCK WHICH IS PHONETICALLY UNIQUE AND OF WHICH THE BLOCK TO BE ENCODED IS A PART, AND THEN ENTERING, AS THE FINAL SECTION OF THE SAME TYPING SEQUENCE, ON A SPECIAL SET OF KEYS BEARING THE POSITION MARKS, THE POSITION DATA IDENTIFYING THE POSITION(S) WHICH THE CHARACTER(S) OF THE BLOCK TO BE ENCODED OCCUPY IN THAT LONGER BLOCK.

Figures 4A, 4B, 4C, 4D, 4E, 4F, 4G:
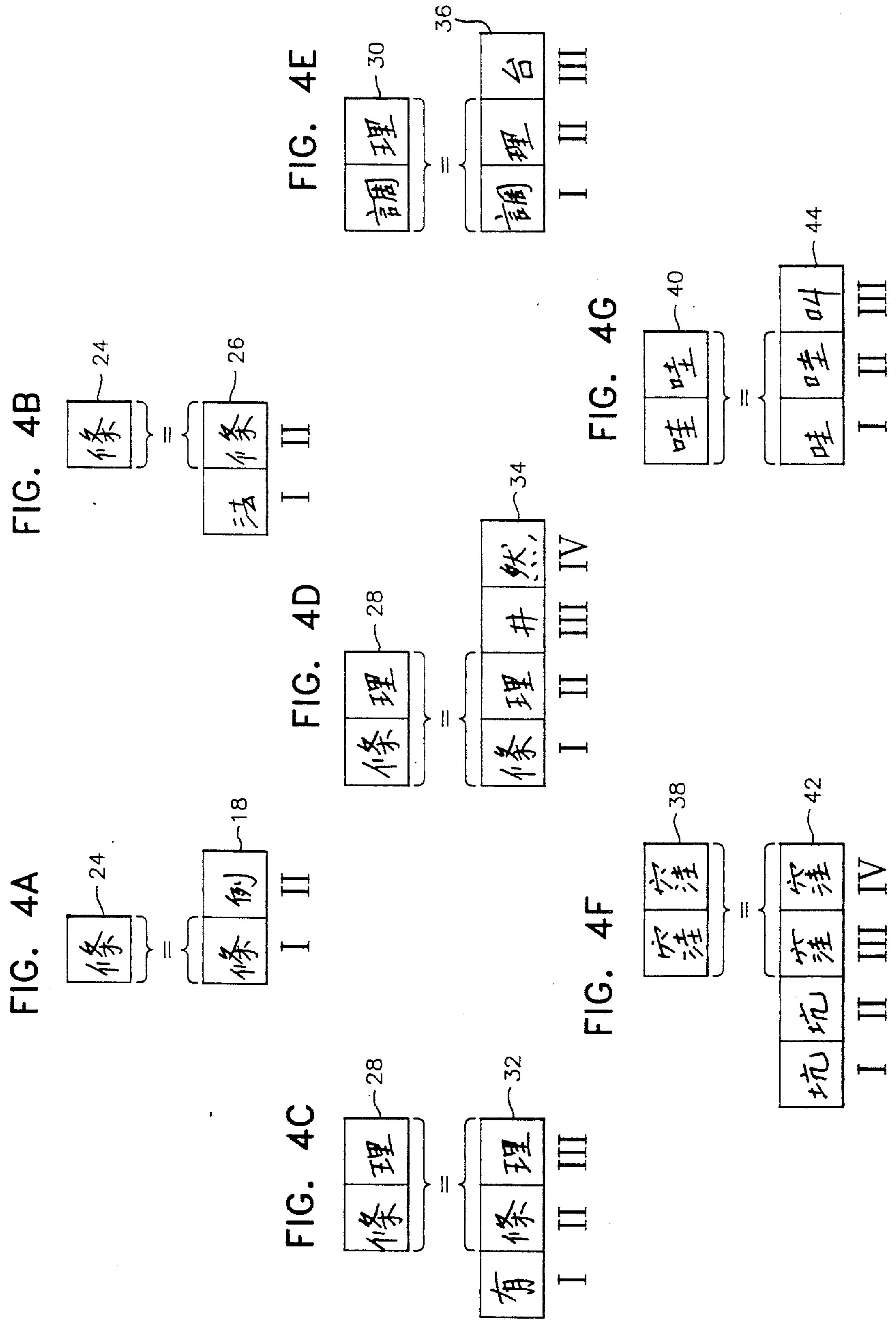
FIGS. 4*a*–4*g* are schematic representations showing how by referring to parts of longer character blocks shorter blocks can be identified.

For example, FIG. 4a shows a single-character block 24, the character in which is Character 0002 in FIG. 3. This block has several homophones and cannot be identified by its phonetic data alone. If the operator has to encode Block 24, he should first think of a phonetically unique and commonly used longer block of which Block 24 is a part. Suppose—one possibility—that he think of Block 18, which appeared in FIG. 2 and has already been discussed, but which is also shown in this FIG. 4a. Block 24 occupies the first position in Block 18. According to Rule 4, then, the operator enters the phonetic data of Block 18 (displayed above as String 18a or String 18b) and adds to it a strike on the character position key marked for the first position, in FIG. 1a bearing arbitrarily the Roman numeral I. The typing sequence in the pinyin notation can be written as follows:

(24a₁-type) t-i-a-c 1 -l-i- 1 -I-ENTER.

The generated keyboard signal string written in the numerical codes is then (24a₁-num) 30-35-27-16-2-20=25-4-5-ENTER.

This keyboard signal string can identify a memory address in the assumed code converter computer, and in this address the stored character code is 0002.

The encoding can also be done using the Chinese-style phonetic notation, in the same manner as described above, but for the sake of brevity here and below the "b" varieties of strings are not further given.

But, when about to encode Block 24, the operator could just as likely-another possibility-have thought, for example, of Block 26, in FIG. 4b, as this is also a common combination, is phonetically unique, and also includes Block 24. Block 26 is composed of Characters 0004 and 0002. In this case, the block to be encoded (Block 24) occupies the second position in the longer block (Block 26), and so in the process of encoding the operator finally strikes the character position key marked II. Here the typing sequence is (24a₂-type) f-a- V -t-i-a-o-1 -II-ENTER and the resulting keyboard signal string in numerical codes (24a₂-num) 19-27-3-30-25-27-16-2-6-ENTER.

In the memory location identified by String 24a₁, that is, 0002.

Block 24 can be encoded, as exemplified, with the help of either Block 18 or Block 26. And these are only two of the several possible common longer blocks, readily available in Chinese, that the operator could have tought of. (In designating the encoding strings, the adding of the lower index FIGS. "1" and "2" is intended to show the fact that there are a number of possibilities.) The present encoding method allows several choices of longer blocks with the help of which shorter phonetically not unique blocks can be encoded. Still, this does not mean that an indefinitely large number of memory locations have to be prepared for such possibilities in the assumed code converter computer's memory. the number of the required locations is restricted and manageable by stating that those longer blocks must be "common" blocks, commonly used in Chinese.

It has been said earlier that literate speakers of Chinese have a frequently used pattern for identifying characters in speech (this is the pattern on which Rule 4 is based). And what is frequently used is not only the pattern itself but also the actual choices of certain longer blocks for identifying given shorter ones. In the examples given above, a certain character A was indentified as being a constituent of the character combination AB or BA. Now the fact is that whenever Chinese speakers use such a pattern to identify A, they customarily refer only to a few AB or BA combinations. In everyday usage some combinations have emerged that both speakers and listeners have found most clear, most telling, most adept, and these are the ones used almost every time A is to be identified. Speakers of Chinese, especially native speakers (the expected operators in the practice of the present method), do not have expressly to learn them; they know which these combinations are from the knowledge of the language. (If in the extended practice of the method of the invention it is found that for some rarely used phonetically not unique blocks that kind of "longer blocks" by which native speakers of Chinese would commonly or typically identify them are not readily available, arbitrary "longer blocks" can also be assigned to be used in such cases and a list of shorter blocks in question with the corresponding arbitrarily assigned "longer blocks" be prepared in the form of a manual or index for the operators to consult.)

In preparing the memory locations in the assumed code converter computer, therefore, of all the possible combinations available in the Chinese language, only those commonly or typically used need to be considered. For encoding Block 24, for example, at most 5-6 common combinations as longer blocks need to be considered, and in everyday practice actually only the 2-3 most common ones of these will be used by the operators.

Considering, then, all the cases when a phonetically not unique single-character block is to be encoded with the help of a longer block, following Rule 4, if out of the 10,000 characters used today for the most frequently used 1000 we allow up to 10 common identifying combinations (longer blocks) to be available for each when they are to be encoded, and proportionately fewer combinations for the less frequently used ones (less frequently used characters naturally have fewer associations in the language), the number of memory location required for all these cases can be estimated to be around 40-60,000. The cases when two-character or longer blocks are phonetically not unique (and have to encoded, again following Rule 4, with the help of even longer blocks) are very few, as said earlier; only a few hundred, or maybe 1-2000, more memory locations would be enough to cover these cases. And going back to the cases of the phonetically unique blocks, encoded by Rule 3, the number of such blocks and so the number of separate memory locations required for code conversion when such blocks are encoded can be estimated from the number of the two-, three- or four-character entries in a Chinese dictionary, which depending on its comprehensiveness can be anywhere between 40,000 and 100,000.

The present method requires a great number of memory locations in the assumed code converter computer's memory file system and an extensive preparatory work in storing the information there, but once that has been done the actual encoding at the keyboard is easy as the possibility occurring varieties in the encoding have already been taken case of previously. The operator has only to follow the few major encoding rules; he does not have to remember and apply time and again numerous other detailed rules, as is often the case in other encoding systems. In the present encoding system, the more frequently a character is used, the more easily and congenially to the language, that is, with fewer arbitrary rules to be learned, can that character be encoded. Only in the case of rare characters might the encoding process somewhat slow down (because some thinking or checking might be required) or might be necessary to apply some arbitrary rules.

In the description above, the assumed code converter computer connected with the keyboard converts the coded signal string identifying a phonetically not unique block the same way as that identifying a phonetically unique one, that is, referring simply to one memory location (identified by the full string), where the corresponding (single or plural) character code information is stored. This can be called the one-string identifier code conversion operation.

Figure 7A:
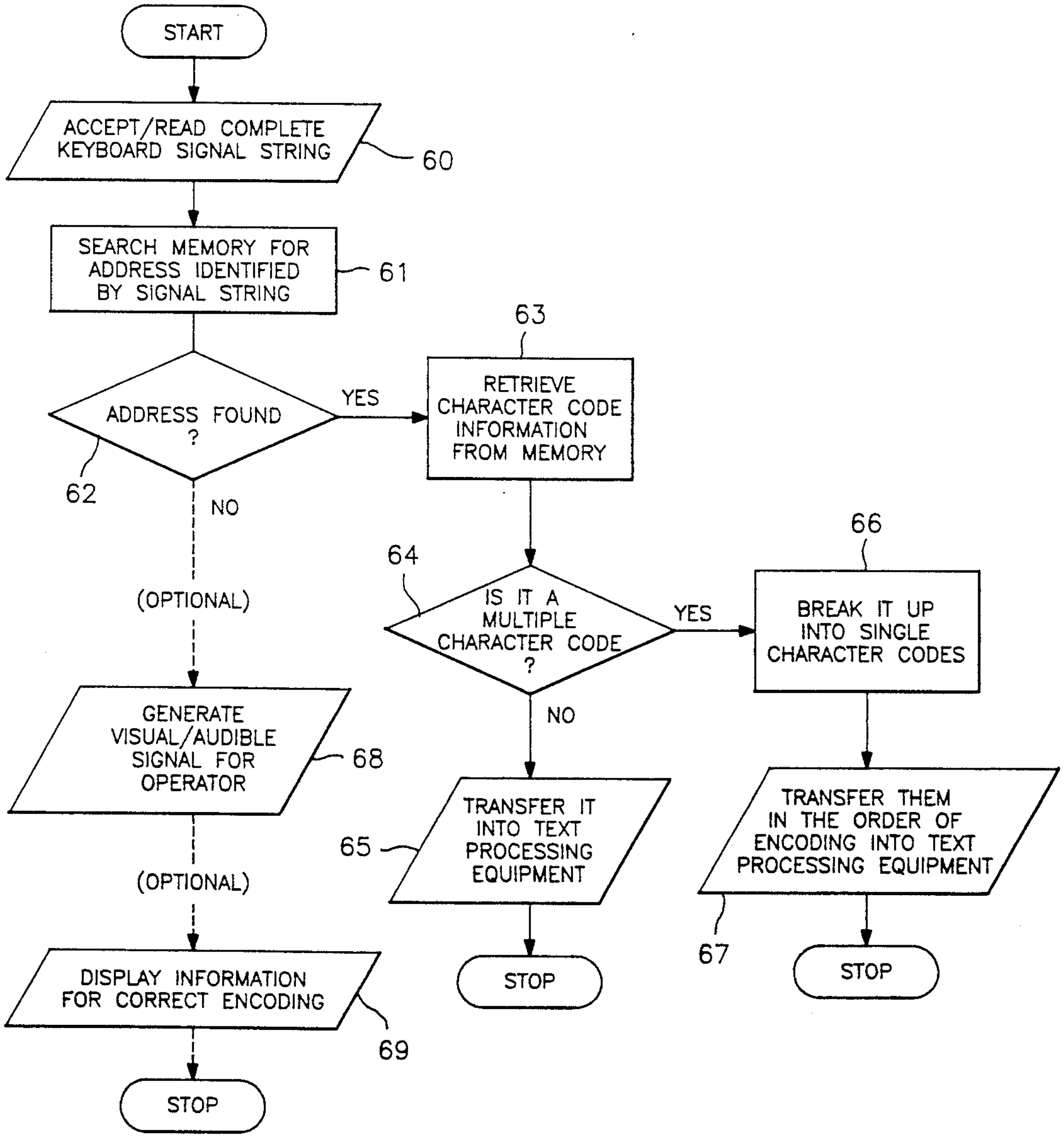
FIG. 7A is a flowchart of a code conversion operation in which a single-string input by an operator is processed to generate character code output into the text processing equipment.

FIG. 7A illustrates, in a program flowchart form for the CPU 48, in the arrangement shown in FIG. 6A, the one-string identifier code conversion operation previously described. The CPU accepts all the data-carrying signals (those carrying phonetic data and those carrying character position data, in case this latter kind of data have also been entered in the typing process of encoding) as one complete signal string 60 which serves as a memory address. The CPU then searches the memory means to find this address 61. In case the address has been found, the CPU retrieves the information stored there 63. Program steps 64, 65, 66, 67, whereby the signal strings retrieved from the memory means are sorted into those carrying single character code information and those carrying multiple character code information, have been disclosed earlier as an optional step whenever a multi-character block of text is encoded by just one encoding typing sequence. The optional steps 68 and 69, employed in case no memory location is found corresponding to the address, have also been discussed earlier.

Within the essential framework of the present encoding method, there is the possibility of, at least, one other way of performing the code conversion. This alternative way holds for the encoding and subsequent code conversion of phonetically not unique blocks, that is, when the "character position keys" are also used. In this alternative, the typing sequence is slightly altered, but still basically follows Rule 4. The difference is that what was one signal string in the earlier description is now, in this alternative, broken up into two signal strings. The first is made up of the individual phonetic data key signals corresponding to the longer character block (with the help of which a shorter block is encoded) and the second of the coded signal or signals resulting from the actuation of one or more "character position keys" as required by Rule 4. The assumed code converter computer can be so programmed that the (now separate) first signal string identifies a memory location and the information called up from there, which is a plural character code corresponding to the longer character block, is temporarily stored in the computer. And the second signal string, carrying the character position key code or codes, now a separate command signal entering the computer circuit at a different point, instructs the computer to pick out and further transmit from that temporarily stored signal string (carrying a plural character code) only that or those segments of the string (each carrying just one character code) that are specified by the character position key signal(s).

Figure 7B:
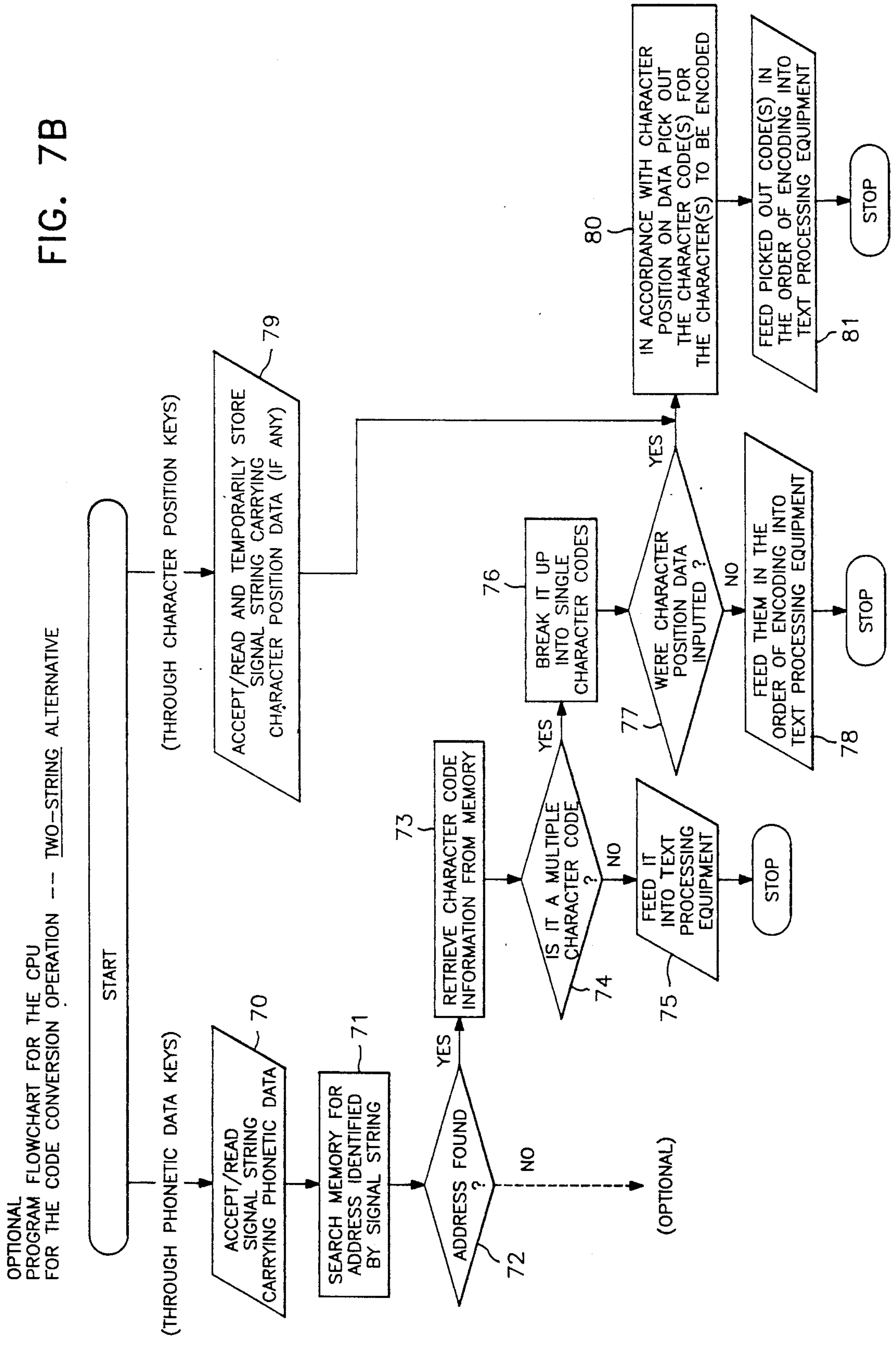
FIG. 7B is a flowchart of a code conversion operation in which a two-string input of phonetic data and character position data is processed to generate character code output.

FIG. 7B is an optional program flowchart for the CPU 48 (as shown in FIG. 6A) for the two-string way of code conversion operation. The CPU accepts and reads the signal strings carrying the phonetic data (step 70) and those carrying the character position data (step 79)(in case the latter kind of data are also entered) separately. The steps of searching the memory means (step 71), retrieving the character code information (step 73) and breaking up the signal strings carrying multiple-character code information into signals carrying single-character information (step 74, 75, 76) are the same as steps 64, 65 and 66 in FIG. 7A. The CPU is so programmed that, in accordance with the character position data entered through the character position keys, it picks out (step 80) from the signal strings carrying single-character information only those indicated by the character position data and finally feeds only these signal strings into the Chinese text processing, display, etc. equipment into which the data entry is being made, as discussed earlier.

To effect this at the keyboard, the operator actuates, immediately after entering the phonetic data of the longer block, a special "(temporarily) STORE" key (15 in FIG. 1*a*), but otherwise there is no change in the typing sequence, which, in this alternative, for example, for Block 24, in the pinyin notation, encoded with the help of the two arbitrarily chosen longer blocks mentioned above, will be ($24a_1$-type-alt) t-i-a-o-/ -1-i- / -STORE-I-ENTER ($24a_2$-type-alt) f-a-∧ -t-i-a-o- / -STORE-II-ENTER.

(The letters "alt" in the designation of the strings refer to the alternative, two-string way of computer processing.)

For the computer, however, in this alternative, each of the above typing sequences results in two separate signals, which written as numerical code strings will be ($24a_1$-num-alt) 30-25-27-16-2-20-25-4-STORE and 5-ENTER ($24a_2$-num-alt) 19-27-3-30-25-27-16-2-STORE and 6-ENTER.

Thus, the code converter computer can process a key signal string identifying a phonetically not unique block either, as described first, as a single string or alternatively as broken up into two strings, if that STORE signal is introduced into the typing sequence. Both of these possible ways of code converting operations presuppose that the encoding at the keyboard has been done according to the encoding method of the present invention.

Whether the one-signal-string or the alternative two-signal-string way of processing is employed depends on computer technological considerations and does not effect the encoding method; the code conversion, strictly speaking, lies outside the scope of the invention. It can be pointed out, nevertheless, that in employing the two-signal-string way of processing, the two above mentioned memory file systems-that containing about 40–60,000 locations for use when the encoding follows Rule 4 and that containing 40–100,000 locations required when encoding according to Rule 3—need not be prepared separately: each location originally required in the former file system would then be one already set up in the latter (larger) file system.

Further examples follow to illustrate how phonetically not unique multiple-character blocks can be encoded by Rule 4. In the following examples, for brevity, only the alphabetic-plus-tone mark typing sequences in the pinyin notation, and only the typing sequences required for the one-signal-string way of computer processing, will be indicated.

Block 28 in FIG. 4*c* consists of Characters 0002 and 0005. This block is phonetically not unique as it has a homophone block, Block 30, shown in FIG. 4*c*. If the operator wants to encode Block 28, he has to follow Rule 4, and he could very likely think of Block 32 as a longer block with the help of which to encode Block 28. Block 32 consists of Characters 0007, 0002 and 0005, and so the characters making up Block 28 occupy the second and the third position within Block 32. Thus the typing sequence will be ($28a_1$-type) y-o-u-ˇ-t-i-a-o-/ -1-i-ˇ-II-III-ENTER.

And the character code information stored in the memory location identified by the resulting keyboard signal string will be the double character code 0002–0005.

But the operator, to distinguish Block 28 from its homophone, could also have thought of Block 34 as a "helpful" longer block. Block 34, shown in FIG. 4*d*, containing four characters (0002, 0005, 0008 and 0009), and the positions of the characters of Block 28 within this longer block are the first and the second. The typing sequence will then be ($28a_2$-type)
t-i-a-o-/ -1-i-ˇ-j-i-n-g-ˇ-r-a-n-/ -I-II-ENTER.

And if the operator has to encode the homophone of Block 28, that is, Block 20, he would very likely do so with the help of Block 26, in FIG. 4*e*, as perhaps the only longer combination available for this purpose. Block 36 contains Characters 0006, 0005 and 0010, and so the relevant positions for the characters of Block 30 in this combination are the first and the second. The typing sequence will therefore be (30a-type) t-i-a-o-/ -1-i-ˇ-t-a-i-/ -I-II-ENTER.

Block 28, in FIG. 4*f*, consisting of two Character 0011's, is again phonetically not unique. It has at least one homophone, Block 40, in FIG. 4*g*, consisting of two Character 0012's. FIG. 4*f* and FIG. 4*g* show how these homophone blocks can unambiguously be encoded, for example, with the help of Block 42 (Characters 0013, 0013, 0011 and 0011) and Block 44 (Characters 0012, 0012 and 0014) respectively. The typing sequence will be (38a-type)
k-e-n-g-—-k-e-n-g-—-w-a-—-w-a--
-III-IV-ENTER (40a-type) w-a-—-w-a—-j-i-a-o-\ -I-II-ENTER.

Optional Intermediate Morpheme Code Conversion

The present invention also discloses, in addition to the encoding method described above, an optional intermediate "morpheme code conversion" step, which can be performed by a separate unit of the assumed code converter computer. this step would consist in first converting signal strings or definite segments of these strings, one by one, into another set of signal strings specified by "morpheme codes," and then using these morpheme-coded strings to identify the locations in the character code information memory system to call up and further input the strings carrying the character codes themselves.

This intermediate step is built on the recognition and novel utilization of a special feature of the Chinese language, and it is offered here because by this step the length of the original keyboard signal strings can be reduced, and this could make the subsequent computer operations simpler and faster.

It has been pointed out that in Chinese the number of the speech morphemes, that is, the number of actually occurring elementary (syllabic) combinations of individual speech sounds, is quite limited. Time and again during the encoding the operator enters the phonetic data of phonetic syllables, which are the pronunciations of individual characters. For each phonetic syllable he strikes a number of speech sound keys, followed by one strike on a tine quality key. For the speech sounds, if he uses an alphabetic notation, he uses the 26 keys bearing the letters of the alphabet, or if he uses the Chinese-style notation, the 37 keys bearing the Chinese-style symbols. For every phonetic syllable he altogether strikes 2–5 alphabetic letter keys or 1–3 Chinese-style symbol keys before he strikes the tone quality key. And since the combinations of individual speech sounds in Chinese are quite limited, the actually occurring speech sound key combinations (sequences) in the encoding are much fewer than all the theoretically possible ones. In Mandarin Chinese, for example, there exist only about 410 speech sound combinations for forming phonetic syllables, if the tone quality variations are not considered. In fact, each of these 410 combinations are pronounced in up to four (for some combinations, fewer) different tones, and each of these tone varieties are different "words" (or word components) in Chinese. But even if these tone varieties are also counted, there are approximately only 1280 different speech morphemes in Mandarin Chinese.

This fact can be utilized. A separate unit of the assumed code converter computer can first convert each keyboard signal string or segment of the string which corresponds to one phonetic syllable into another signal string specified by a "morpheme code," one single code number standing for the whole syllable. For this operation a separate memory file system is needed, but this system would be much smaller than those (discussed earlier) yielding the character code information. In case Mandarin Chinese is used for encoding, only approximately 1280 memory locations are needed in this morpheme code conversion file system. Those segments of the keyboard signal string that correspond to one phonetic syllable would each identify a location in this morpheme code conversion memory file system, and in each location the respective one "morpheme code" information is stored. This information can be called up, and then signals carrying these morpheme codes (instead of the original keyboard signal string) be used in subsequent computer operations. And these signals now specified by the morpheme codes will always be shorter, that is, their linear structure will be specified by fewer code numbers or code elements, than the original keyboard signal strings.

But if this intermediate morpheme code conversion step is to be adopted in the code converter computer, it will be necessary to further separate or delimit each segment of the keyboard signal string corresponding to one phonetic syllable from the segment preceding and following it. As the last key struck entering the data of a phonetic syllable is always a tone quality key, in the encoding system employing this morpheme code conversion step, the tone quality keys, unlike the other speech sound data keys, must be mechanically so constructed that their actuation generates two signals one after the other: the first one is the specific coded signal for the tone quality (indicating which tone quality the just entered phonetic syllable has) and the second one a delimiting and command signal indicating to the control section of the morpheme code conversion unit that the data entry of a phonetic syllable has been completed and that the morpheme code conversion is to be performed. In the following, a slash (/) after the code number of the tone quality key represents visually this command signal.

Below are examples showing the morpheme code conversions when encoding some of the character blocks already discussed above. The typing sequences need not be given again as they are exactly the same as those above. Only the linear structures of the signals, expressed by code numbers and other symbols, will be given. The morpheme code numbers are those arbitrary ones listed in FIG. 3.

For encoding Block 16, a single-character phonetically unique block (Character 0001), in Mandarin Chinese and using the pinyin phonetic notation, the coded structure of the signals generated in the stages one after the other will be (16a-num)

I. (generated by the keyboard) morpheme — 15-10-22-16-1/-ENTER (into the code converter)

↓ (converted)

II. (generated by the morpheme code converter) — 821-ENTER (into the character code converter)

↓ (converted)

III. (generated by the character code converter) — 0001-ENTER (into the electronic equipment receiving the text data entry)

In case the same block is encoded using the Chinese-style phonetic notation, the first signal string will be different but the others the same (16b-num)

I. 15-11-29-1/-ENTER

↓

II. 821

↓

III. 0001

The double-character Block 18 (Characters 0002 and 0003), which is also phonetically unique, would be encoded like this (18a-num)

I. 30-25-27-16-2/-20-25-4/-ENTER

↓ ↓

II. 315-332

↓

III. 0002-0003

If the phonetically not unique single-character Block 24 (Character 0002) is encoded with the help of Block 18 (just displayed) as a longer block, supposing that the one-signal-string way of conversion process is employed in the character code converter, the signals generated can be expressed like this ($24a_1$-num)

I. 30-25-27-16-2/-20-25-4/-5-ENTER

↓ ↓

II. 315-332-5

↓

III. 0002

In all cases of encoding, such morpheme code conversions can be done in the same manner. The employment of this intermediate step can be illustrated by a comparison: it would be like a hypothetical operator with an exceptionally good memory, who could learn by heart all the 1280 morpheme code numbers assigned to the various speech morphemes in Mandarin Chinese and who would thus be able to enter on the keyboard, after inspecting or thinking of a character not the individual speech sound and tone quality data, but directly the morpheme code number itself assigned to that character.

But whether the adoption of such an intermediate morpheme code conversion step is advisable depends on computer technological considerations and is left open here.

Optional Arrangements for the Special Function Keys

Figure 5A:
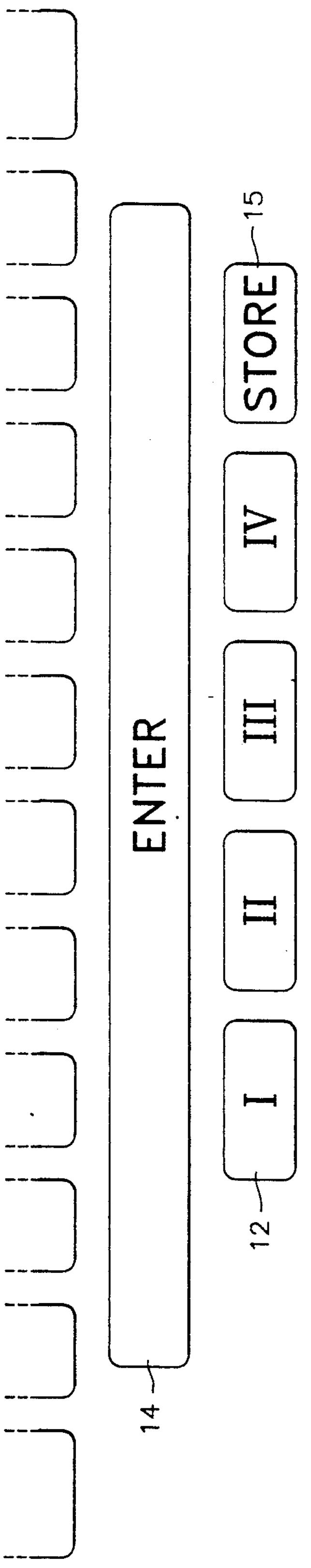
FIGS. 5*a*–5*c* show some of the other possible arrangements, besides that in FIGS. 1*a* and 1*b*, of the "character position keys", encoding control keys, and the space bar on a keyboard to be used in the present invention.
Figure 5B:
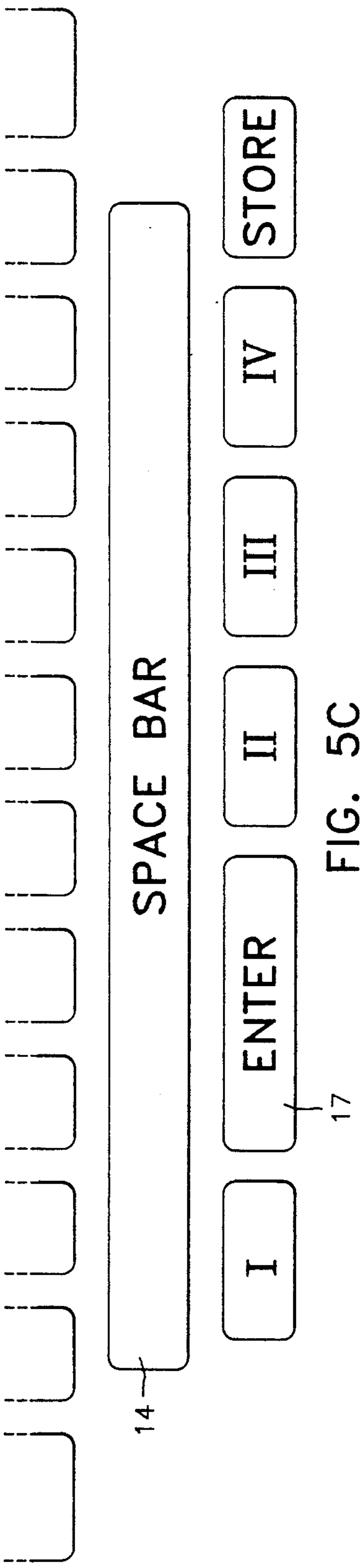
Figure 5C:
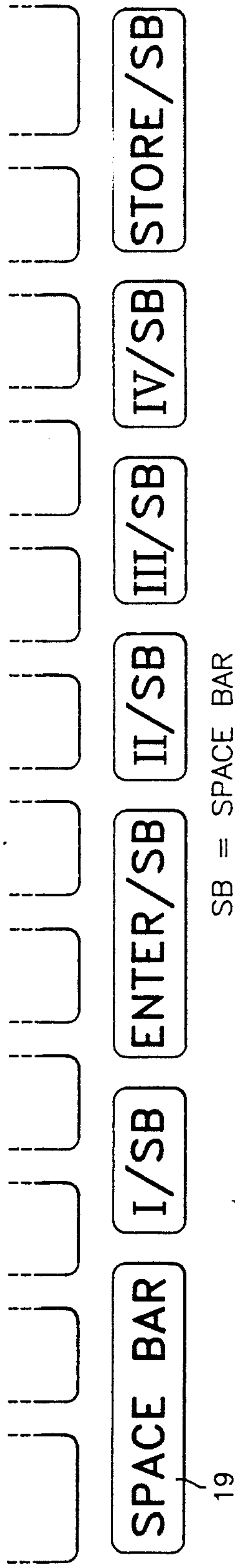

FIGS. 5*a*–5*c* show various possible arrangements of the space bar, the character position keys, the ENTER (delimiter) key and the (temporarily) STORE key, in addition to the preferred arrangement shown at the bottom of FIGS. 1*a*. In FIG. 1*a*, the space bar 14 is also the ENTER key, and all the other keys mentioned above are between the space bar and the main body of the phonetic data keys.

IN FIG. 5*a* the arrnagement is simply the reverse of the preferred arrangement: the space bar is stil the ENTER key, but all the other keys are placed, in one row, below the space bar.

In the arrangement in FIG. 5*b*, unlike those listed above, the space bar is not used when Chinese texts are encoded on the keyboard (or is used only as a conventional space bar). Here a separate ENTER key (or bar) 17 is provided, placed preferably at or near the center and between the first and the second character position key, as these two are the most often used ones. The row of the ENTER key, the character position keys and the STORE key is shown here below the space bar, but the position of this row and that of the space bar can be reversed.

Finally, in FIG. 5*c* the conventional space bar is broken up into a row of keys (or bars), preferably in the order as shown here. Except the key (or bar) at the left end 19, which is only a space bar, all the other keys in the row have here two functions, the function depending on what the keyboard is used for. When it is used to encode a Chinese text, they have the functions as marked on them at the left-hand side, otherwise (when, for example, an alphabetic text is entered) each of them separately is a space bar (in the drawing marked as SB) and any one of them can be struck at the convenience of the operator.

As all these keys (or bars) are most likely to be struck by the thumbs of the operator, their tops should preferably be wider (longer) than those of the keys struck by the other fingers.

The Alternative Embodiment: Speech Sound Analyzer

The embodiment of the invention considered so far has been that employing an electronic keyboard for entering the phonetic data. The other embodiment replaces this keyboard, at least a large section of the keyboard, by an electronic speech sound analyzer and recognition means (hereinafter briefly called "speech sound analyzer") working on acoustic principles. As viewed in the present invention, this can be a speech sound analyzer based on any of the technologies available in the field. What is sufficient for and required from the speech sound analyzer to be used for encoding Chinese texts according to the method here described, and therefore to fall within the scope of the invention, is to generate a variety of sequentially coded electronic signal strings which (1) correspond one-to-one to the individual speech sounds and of the tone qualities of phonetic syllables of a given Chinese dialect (as are the signals resulting from keyboard actuations of the respective keys in the description above), or which (2) correspond one-to-one to and are indicative of the different speech morphemes to be found in that dialect.

Figure 6B:
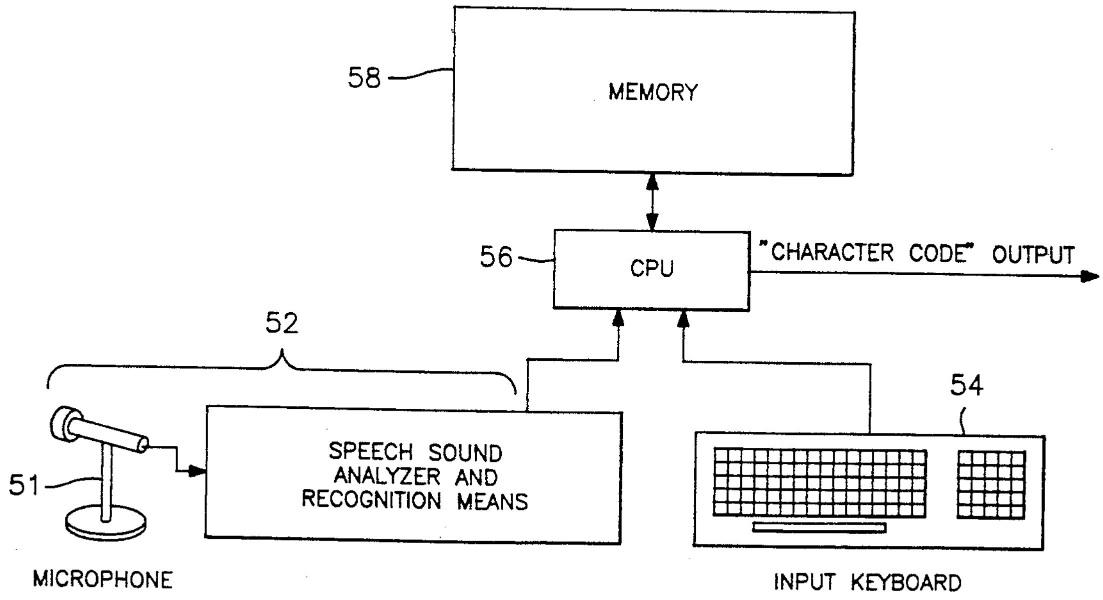

FIG. 6B is a block diagram of the function elements of the encoding and data entry means in the case in which a speech sound analyzer is used in addition to or instead of the input keyboard means to enter the speech sound (phonetic) data of the characters for the purpose of encoding. The speech sound data may be entered, in one possible arrangement, at the option of the operator, either by the speech sound analyzer and recognition means 52 or by the input keyboard means 54. In another arrangement, all the speech sound (phonetic) data are entered by the speech sound analyzer 52 and only the character position data and control signals are entered by the keyboard 54. The CPU 56 performs the same functions as described for the CPU 48 in FIG. 6A, i.e., it can process the signal strings generated by the keyboard and also those generated by the speech sound analyzer. The memory 58 performs also the same functions as the memory 50 in FIG. 6A.

Encoding by such a speech sound analyzer proceeds by the same basic rules given above, with the following differences. Whenever the data of a phonetic syllable are to be entered, instead of typing these data on keys, the operator reads the accurate pronunciation of the syllable into the analyzer. And the sequence of the syllables to be read is that specified by the encoding rules. As to the delimiter signals between phonetic syllables, natural or deliberate gaps (silences) between the syllables, as they are pronounced in sequence, can cause the analyzer to generate such signals, or they may be generated manually by the operator by the actuation of a special control key or similar device for this purpose. Those signals that are generated on the keyboard by the character position keys, which are essential in the present encoding method, can in this second embodiment also be generated by specific voice signals (for example, Chinese ordinal numbers read into the analyzer), or by a set of keys, similar to those on the keyboard, on which the operator manually enters the position data, after having read into the analyzer the pronunciation of a longer character block. Finally it seems that the ENTER signal and the STORE signal (if the latter is used) would most conveniently be generated manually on respective keys provided, though in principal even these can be generated by voice signals.

There can be numerous further variations made in the encoding method and equipment described above without departing from the basic principles and the proper scope of the invention, as set forth in the following claims.

I claim:

1. An operator controllable electronic data entry device for encoding in digital-coded form, for output to word processing equipment in accordance with an encoding method, at least one desired block of a plurality of blocks of Chinese text characters, each of said blocks containing one or more characters in a linear order, said data entry device comprising:

input means for inputting at least one of a plurality of encoding sequences of data, said at least one encoding sequence including phonetic and character position data which are used to encode said desired block in accordance with said encoding method, said input means comprising a means for inputting said phonetic data which corresponds to the pronunciation of each Chinese text character making up said at least one desired block and a means for inputting said character position data indicating a linear position which each text character making up said at least one desired block occupies within a sequence of characters constituting a phrase in the Chinese language; said input means being selectively operable by said operator to input said encoding sequences of data, said input means generating a respective plurality of electronic, digitally-coded signal strings corresponding to said encoding sequences of data;

memory means containing a plurality of memory locations, each said location corresponding to one of said plurality of signal strings generated by the input means and each said location operative to store digitally-coded data for at least one Chinese character, by which coded data said at least one character can be visually reproduced or otherwise processed as required by the word processing equipment into which the data entry is made; and processing means for receiving said signal strings generated by said input means, for searching said memory means for said corresponding memory locations, for retrieving said coded data stored in said memory means, and for outputting said data into the word processing equipment into which the data entry is made.

2. An electronic data entry device as claimed in claim 1, wherein said input means comprises a keyboard which is selectively operable by an operator to input said encoding sequences of data and to generate said respective plurality of digitally-coded signal strings, said keyboard comprising:

phonetic notation keys marked with phonetic notation symbols for entering said phonetic data; and character position keys for entering said character position data.

3. An electronic data entry device as claimed in claim 2, wherein:

said means for inputting phonetic data further comprises speech sound recognition means, acoustically responsive to speech sounds as Chinese characters are spoken by said operator in order to enter encoding sequences of data, for recognizing said speech sounds and generating a plurality of digitally-coded electronic signal strings carrying the phonetic data of the speech sounds for spoken Chinese characters, said speech sound recognition means inputting at least a first portion of said signal strings carrying phonetic data into said processing means;

said plurality of memory locations having a one-to-one correspondence with each of said phonetic-data-carrying signal strings generated by said speech sound recognition means; and said processing means receiving signal strings generated by said speech recognition means, searching said memory for corresponding memory locations, retrieving coded data stored in said memory means, and outputting the data into the word processing equipment into which the data entry is made.

4. An electronic data entry device as claimed in claim 1, wherein said means for inputting phonetic data comprises speech sound recognition means for entering at least a part of said phonetic data.

5. A method for identifying, within a text, Chinese characters for coded entry of said characters in a word processing system by a data entry device comprising: at least (a) a keyboard having actuable keys for inputting phonetic data, indicating a pronunciation of said characters, and actuable keys for inputting character position data, indicating the linear position which said characters occupy within a sequence or block of characters constituting a phrase in the Chinese language, and outputting a plurality of digital coded strings of signals in response to a sequence of actuating said keys, (b) a memory having a plurality of locations corresponding uniquely to each of said plurality of digital coded strings and storing therein at each location a digital code representing at least one Chinese character, and (c) a processor means responsive to digital coded strings from said keyboard to search said memory for locations corresponding to said strings and to retrieve digital codes representing Chinese characters therefrom, said method comprising the steps of:

dividing the text in which said characters are to be identified into blocks of characters, each block containing one or more characters; and executing on said keyboard for each of said blocks one uninterrupted identifying typing sequence, wherein (i) the identifying typing sequence for the characters contained in a block having a unique pronunciation comprises typing on said keyboard, in a sequence as speech sounds are pronounced when the characters are spoken, the phonetic data of each character being contained in said block, and (ii) the identifying typing sequence for the characters contained in a block having a pronunciation that is not unique comprises (a) first typing the phonetic data of the characters making up a block longer than said block having a pronounciation that is not unique, said longer block being selectable from a plurality of blocks which constitute phrases in the Chinese language and have a pronounciation that is unique, said block having a pronounciation that is not unique being a part of said longer block, and (b) then on the actuable keys for character position data typing, as part of the same identifying typing sequence, position data specifying the linear position which each character of said block having a pronounciation that is not unique occupies within the sequence of characters making up said longer block.

6. An electronic data entry device for encoding in digital-coded form, for output into word processing equipment, at least one desired block of a plurality of blocks of Chinese text characters, each of said blocks containing one or more characters in linear order and each of said characters and each of said blocks having a pronounciation identifiable by phonetic data, and the encoding of said at least one desired block proceeding as follows when utilizing said data entry device:

in the case in which the pronunciation of said at least one desired block is unique, encoding said block on the basis of a specific sequence of phonetic data of each said character making up said block, said phonetic data representing the pronunciation of said character, and in the case in which the pronunciation of said at least one desired block is not unique, encoding said block on the basis of (1) a specific sequence of phonetic data representing the pronunciation of a block of characters longer than said desired block, said longer block also being one of said plurality of blocks of Chinese text characters, the pronunciation of said longer block being unique and said at least one desired block being a part of the linear sequence of characters in said longer blocks and (2) a specific sequence of character position data representing the linear position which each of the characters making up said at least one desired block occupies within said longer block, said data entry device comprising:

(a) a first input means for inputting, when a user determines that the pronunciation of said at least one desired block is unique, at least one of a plurality of sequences of said phonetic data representing the pronunciation of each of the characters making up said at least one desired block, said sequence of phonetic data being used to encode said block, and generating at lease one of a respective plurality of strings of electronic signals, said at least one string of signals carrying said at least one sequence of phonetic data and being used to encode said desired block in digital-coded form;

(b) a second input means for additionally inputting, when a user determines that the pronunciation of said at least one desired block is not unique, at least one of a plurality of sequences of said character position data representing the linear position of each character contained in said at least one desired block within a block longer than said desired block, said sequence of phonetic data and sequence of character position data being inputted in sequence by said first and second input means to uniquely encode said at least one desired block, and said first and second input means generating in the same sequence at least one of a respective plurality of strings of electronic signals corresponding to the input sequences of phonetic and character position data, said at least one string of signals carrying one sequence of phonetic and character position data encoding said at least one desired block in digital-coded form;

(c) memory means containing a plurality of memory locations, each said location corresponding to one of said plurality of signal strings generated by said first input means or said first and second input means in sequence, and each said location operative to store digitally-coded data for at least one Chinese character, said coded data being used when visually reproducing or otherwise processing said at least one character by the word processing equipment into which the data entry is made; and (d) processing means for receiving said signal strings generated by said first input means or said first and second input means in sequence, for searching said memory means for the corresponding memory locations, for retrieving said coded data stored in said memory means, and for outputting said data into the word processing equipment into which the data entry is made.

7. An electronic data entry device as claimed in claim 6, wherein said first and second input means are respective sections of a keyboard on which an operator types said encoding sequences, said keyboard comprising:

phonetic notation keys marked with phonetic notation symbols for entering said phonetic data; and character position keys marked with numerals or symbols representing a linear sequence for entering said character position data.

8. An electronic data entry device as claimed in claim 7, wherein said data entry device further comprises speech sound recognition means, acoustically responsive to speech sounds as Chinese characters are read, for generating a plurality of digitally-coded electronic signal strings, each different phonetic data for Chinese characters being carried by respective different signal strings, said speech recognition means inputting said signal strings carrying phonetic data into said processing means, at least a part of the phonetic data used for the encoding of said blocks of characters being entered by said speech sound recognition means, said memory locations having a one-to-one correspondence with the different phonetic-data-carrying signal strings by said speech sound recognition means, and said processing means processing the signal strings generated by said speech sound recognition means in a manner the same as said processing means processes the phonetic-data-carrying signal strings generated by at least one of said first and second input means.

9. An electronic data entry device as claimed in claim 6, wherein said first input means comprises speech sound recognition means for entering at least a part of said phonetic data.

10. A computer-implemented method of identifying a block of Chinese characters, said block containing one or more characters for which information related thereto is stored in memory at an individually addressable location, comprising the steps of:

a) inputting a first string of signals comprising at least encoded phonetic data for said characters in said block, b) comparing said input string with the addresses of individual locations in memory, c) upon detection of an identity between said input string and an address in memory, retrieving the information stored at the corresponding memory location, d) determining whether said information represents a single character or multiple characters and, in response thereto:

(i) utilizing said information to generate a block comprising one text character when said information is determined to represent a single character, and (ii) dividing said information into a plurality of single character codes and utilizing said single character codes to generate a block comprising a sequence of text characters, when said information is determined to represent multiple characters.

11. The computer-implemented method of claim 10 further comprising the steps of selectively inputting a second string of signals comprising encoded representation of character position data, following the dividing of information into a plurality of single character codes, determining whether character position data has been input and, in response thereto:

(i) utilizing said information to generate a block comprising a sequence of all text characters whose phonetic data previously was inputted, when said character position data has not been input, and (ii) in accordance with said second string of signals, selecting from among said plurality of character codes the codes of the character making up the block to be identified and utilizing said coded character position data to generate a block made up in linear order of only those text characters which had been identified by said second string of signals.

12. The computer-implemented method of claim 11 wherein said determining step is performed on the basis of the pronunciation of an initial block of characters.

13. The computer-implemented method of claim 12 wherein, if the pronunciation of said initial block of characters is determined not to be unique, in response thereto a larger block comprising said initial block and additional information in a subsequent string is identified, the pronunciation of said larger block being unique, and said larger block together with a string of position data identifying the position of said character within said larger block being used to identify said desired character.

14. A method of selecting and inputting in digital-coded form a desired block of Chinese characters into an electronic information processing system, said desired block being one of a plurality of blocks of characters in the Chinese language, each of said blocks containing one or more characters in linear order with each of said characters having a corresponding pronounciation, said method utilizing (i) phonetic data input means for inputting respective phonetic data of respective Chinese characters, said phonetic data for each character corresponding to the pronunciation of said character, and a digital code carried by the respective signal string generated by said phonetic data input means in response to being selectively actuated serving as a phonetic identifier code for said character, further a sequence of pronunciations of characters making up a block being the pronunciation of said block and a sequence of phonetic identifier codes for the characters making up a block being the phonetic identifier code for said block, said method further utilizing (ii) character position data input means for inputting the linear position or sequence data of a character or characters within a linear block of characters as said characters make up a phrase or a text in the Chinese language, said phonetic data input means and said character position data input means being further connected through a data processing means to an addressable memory means and to said information processing system into which the data entry is made, said method comprising the steps of:

(a) providing a location in said memory means for at least each of the blocks, of said plurality of blocks, having a non-identical pronunciation and identifying each of said locations with the respective phonetic identifier code for said block, said phonetic identifier code serving as the address of said location;

(b) storing character code information at each of said locations, the number of pieces of component parts of character code information and the sequence in which said pieces are stored at each location being the same as the number of characters and the sequence thereof which make up the respective block of which the phonetic identifier code serves as the address of said location, each piece of character code information standing for one Chinese character and being the digital code information used by said information processing system to visually reproduce or transmit or otherwise process said Chinese character;

(c) in the case in which the pronunciation of said desired block is unique, no other block of characters in Chinese having the same pronunciation as said desired block, (i) selectively operating said phonetic data input means to input a string of signals carrying the phonetic identifier code of said block, (ii) comparing in said data processing means said phonetic identifier code with the addresses of locations in said memory means, (iii) upon detecting an identity between said phonetic identifier code and an address in said memory means, retrieving by said data processing means the character code information stored at said location, and (iv) outputting from said data processing means a signal string carrying said information into said information processing system into which the data entry is made; and (d) in the case in which the pronunciation of said desired block is not unique, there being at least one other block in the Chinese language containing at least one different character but having the same pronunciation as said desired block, (i) selectively operating said phonetic data input means to input a first string of signals carrying the phonetic identifier code of a block of characters longer than said desired block and selected from among said plurality of blocks of characters in the Chinese language, the pronunciation of said longer block being unique and said desired block to be selected being a part of said longer block, (ii) selectively operating said character position data input means to input a second string of signals carrying the data indicating the linear position of each character of said desired block within the linear sequence of characters in said longer block, (iii) comparing in said data processing means said phonetic identifier code carried by said first string of signals with the addresses of locations in said memory means, (iv) upon detecting an identity between said phonetic identifier code carried by said first input string and an address in said memory means, retrieving the character code information stored at said memory location, and (v) dividing the signal string carrying said character code information retrieved from said memory location into segments of strings, each of said segments carrying one piece of character code information, and feeding into said information processing system, in the sequence in which said linear position data had been inputted, only those of said segments which carry the character code information for the character or characters making up the desired block, as specified by said input of linear character position data.

15. The method of claim 14, wherein said phonetic data and character position data are input through an electronic input keyboard with keys marked respectively with phonetic notation symbols for inputting said phonetic data and with figures, numerals, or symbols representing a linear sequence for inputting said character position data.

16. An electronic keyboard data entry method for Chinese character texts, comprising the steps of:

(a) dividing the text into blocks of characters, each block containing at least one character, and performing the data entry character block by character block, each block being entered by one uninterrupted typing sequence;

(b) if the pronunciation of a first of said character blocks to be entered is unique in the language, entering, by selective actuation of the keys of said electronic input keyboard, a first string of phonetic data of each character contained in said character block;

(c) if the pronunciation of said first of said character blocks is not unique, entering on said keyboard a second string of phonetic data of a longer block containing at least one more character than said first one to be entered, said longer block having a unique pronunciation and including said character block to be entered, and then entering on the same keyboard position data indicating position(s) which the character(s) of said character block to be entered occupy within said longer block; and (d) repeating steps (b) and (c) for the remaining blocks of the text to be entered.

17. An electronic data entry method as claimed in claim 16, wherein said step of entering said position data is accomplished by using character position keys on said keyboard bearing numerals or other suitable symbols indicating linear positions.

18. An electronic data entry method as claimed in claim 17, wherein said step of entering said phonetic data is accomplished by using a set of keys on said keyboard other than said character position keys, said keys bearing phonetic notation symbols suitable for entering phonetic data of Chinese characters.

19. An electronic data entry method as claimed in claim 18 wherein said entered data is used to uniquely identify a desired character to be output.

* * * * *

UNITED STATES PATENT AND TRADEMARK OFFICE
CERTIFICATE OF CORRECTION

PATENT NO. : 5,164,900

DATED : November 17, 1992

INVENTOR(S) : Colman BERNATH

It is certified that error appears in the above-identified patent and that said Letters Patent is hereby corrected as shown below:

In column 13, line 36, "(18a-type) t-i-a-o-l-l-i-l-ENTER" should be -- (18a-type) t-i-a-o-/-l-i-\-ENTER --.

In column 15, line 28, "($24a_1$-type) t-i-a-c 1 -l-i-l-I-ENTER" should be -- ($24a_1$-type) t-i-a-o-/-l-i-\ -I-ENTER --.

In column 15, line 53, "($24a_i$-type) f-a-v-t-i-a-o-l-II-ENTER" should be -- ($24a_2$-type) f-a-v-t-i-a-o-/-II-ENTER --.

In column 18, line 42, "$24a_1$-type-alt) t-i-a-o-/-l-i-/-STORE-I-ENTER" should be -- ($24a_1$-type-alt) t-i-a-o-/-l-i-\-STORE-I-ENTER --.

In column 18, line 44, "($24a_2$-type-alt) f-a-^-t-i-a-o-/STORE-II-ENTER" should be -- ($24a_2$-type-alt) f-a-v-t-i-a-o-/-STORE-II-ENTER --.

In column 19, line 22, "FIG.4c" should be -- FIG. 4e --.

In column 19, line 49, "Block 20" should be -- Block 30 --.

In column 19, line 50, "Block 26" should be -- Block 36 --.

Signed and Sealed this

Seventh Day of December, 1993

Attest:

BRUCE LEHMAN

*Attesting Officer* *Commissioner of Patents and Trademarks*

UNITED STATES PATENT AND TRADEMARK OFFICE
CERTIFICATE OF CORRECTION

PATENT NO. : 5,164,900
DATED : November 17, 1992
INVENTOR(S) : Colman BERNATH

It is certified that error appears in the above-identified patent and that said Letters Patent is hereby corrected as shown below:

In column 12, line 67, "(16a-type)s-h-u-o-1-ENTER" should be --(16a-type) s-h-u-o---ENTER--.

In column 15, line 33, "($24a_1$-num) 30-35-27-16-2-20=25-4-5-ENTER" should be --($24a_1$-num) 30-25-27-16-2-20-25-4-5-ENTER--.

In column 19, line 22, "FIG. 4c" should be --FIG. 4e--.

In column 19, line 49, "Block 20" should be --Block 30--.

In column 19, line 50, "Block 26" should be --Block 36--.

In column 19, line 59, "Block 28" should be --Block 38--.

In column 20, line 35, "tine quality" should be --tone quality--.

In column 21, line 49, delete the word "morpheme".

UNITED STATES PATENT AND TRADEMARK OFFICE

CERTIFICATE OF CORRECTION

PATENT NO. : 5,164,900

DATED : November 17, 1992

INVENTOR(S) : Colman BERNATH

It is certified that error appears in the above-indentified patent and that said Letters Patent is hereby corrected as shown below:

In column 21, lines 50-51, "(into the code converter)" should be --(into the morpheme code converter)--.

Signed and Sealed this

Seventeenth Day of May, 1994

Attest:

BRUCE LEHMAN

*Attesting Officer*

*Commissioner of Patents and Trademarks*